(12) United States Patent
Murata et al.

(10) Patent No.: US 7,932,952 B2
(45) Date of Patent: Apr. 26, 2011

(54) LIGHT QUANTITY ADJUSTING DEVICE, OPTICAL SYSTEM HAVING THE SAME, AND IMAGE TAKING APPARATUS

(75) Inventors: Yasunori Murata, Tokyo (JP); Takeshi Koyama, Tokyo (JP)

(73) Assignee: Canon Kabushiki Kaisha (JP)

(*) Notice: Subject to any disclaimer, the term of this patent is extended or adjusted under 35 U.S.C. 154(b) by 1802 days.

(21) Appl. No.: 10/318,753

(22) Filed: Dec. 13, 2002

(65) Prior Publication Data

US 2003/0086014 A1    May 8, 2003

Related U.S. Application Data

(63) Continuation of application No. PCT/JP02/10275, filed on Oct. 2, 2002.

(30) Foreign Application Priority Data

Oct. 12, 2001 (JP) ................. 2001-315355
Feb. 20, 2002 (JP) ................. 2002-043121
Feb. 22, 2002 (JP) ................. 2002-046361

(51) Int. Cl.
*H04N 5/225* (2006.01)
*G02B 5/22* (2006.01)

(52) U.S. Cl. .............. 348/360; 359/888; 359/889

(58) Field of Classification Search .......... 348/360, 348/361, 362, 363; 359/577, 580, 586, 885, 359/888, 889
See application file for complete search history.

(56) References Cited

U.S. PATENT DOCUMENTS 5,479,298 A * 12/1995 Yanagi et al. ............... 359/888
6,078,442 A * 6/2000 Tada et al. .................. 359/890
6,771,315 B1 * 8/2004 Nanjo et al. ................ 348/362
6,952,314 B2 * 10/2005 Yanagi et al. ............... 359/888
7,042,662 B2 * 5/2006 Murata et al. ............... 359/888

FOREIGN PATENT DOCUMENTS

| CN | 1115385 | 1/1996 |
|---|---|---|
| CN | 1115385 A | 1/1996 |
| DE | 19828681 | 1/1999 |
| GB | 2326733 | 12/1998 |
| JP | 52-117127 | 10/1977 |
| JP | 01-099015 | 4/1989 |
| JP | 2-190833 | 7/1990 |

(Continued)

OTHER PUBLICATIONS

R.W. Ditchburn, "Light"; 1991; Dover Publications, Inc.; pp. 67-68.*

(Continued)

*Primary Examiner* — Timothy J Henn
(74) *Attorney, Agent, or Firm* — Rossi, Kimms & McDowell LLP

(57) ABSTRACT

An optical performance is deteriorated by a minute phase difference of transmission wave front of an ND filter. In a light quantity adjusting device which includes an ND filter (P1) for attenuating a quantity of light passing through an aperture formed by diaphragm blades (S11 and S12) and in which a cover ratio of the aperture by the ND filter (P1) is changed, setting is conducted such that a phase difference between lights with a predetermined wavelength λ which pass through regions (N11, N12, and N13) of the ND filter (P1) with different transmittances inside the aperture becomes substantially 0λ, substantially 1λ, or substantially 2λ in a state in which the aperture is completely covered with the ND filter (P1).

3 Claims, 29 Drawing Sheets

FOREIGN PATENT DOCUMENTS

| | | |
|---|---|---|
| JP | 02-190833 | 7/1990 |
| JP | 05-072598 | 3/1993 |
| JP | 06-167738 | 6/1994 |
| JP | 6-167738 | 6/1994 |
| JP | 6-265971 | 9/1994 |
| JP | 06-265971 | 9/1994 |
| JP | 07-281250 | 1/1995 |
| JP | 7-281250 | 10/1995 |
| JP | 07-281250 | 10/1995 |
| JP | 08-043878 | 2/1996 |
| JP | 8-43879 | 2/1996 |
| JP | 10133253 A * | 5/1998 |
| JP | 11-023810 | 1/1999 |
| JP | 11-23810 | 1/1999 |
| JP | 11-23811 | 1/1999 |
| JP | 11-44802 | 2/1999 |
| JP | 11-190866 | 7/1999 |
| JP | 2000-036917 | 2/2000 |
| JP | 2000-106649 | 4/2000 |

OTHER PUBLICATIONS

Robert D. Guenther, "Modern Optics"; 1990; John Wiley & Sons, Inc.; pp. 90-94.*

International Search Report Issued by the Japanese Patent Office, dated Feb. 18, 2003.

Notification of Opinion Presentation issued in corresponding Korean Patent Application No. 10-2004-7005386 dated Nov. 23, 2005. English translation only provided.

Notification of the First Office Action issued in corresponding Chinese Patent Application No. 02819809.3 dated Dec. 7, 2007. English translation only provided.

Japanese Office Action dated Mar. 29, 2005, Dispatch No. 112929, and English translation.

Japanese Office Action dated Mar. 29, 2005, Dispatch No. 112937, and English translation.

Japanese Office Action dated Mar. 29, 2005, Dispatch No. 112938, and English translation.

Japanese Office Action dated Aug. 2, 2005, Disptach No. 279151, and English translation.

Japanese Office Action dated Aug. 2, 2005, Disptach No. 279160, and English translation.

Japanese Office Action dated Aug. 2, 2005, Dispatch No. 279162, and English translation.

Japanese Office Action dated Nov. 23, 2005, Appln. No. 10-2004-7005386, and English translation.

Patent Abstracts of Japan for Publication No. 01-099015.

Patent Abstracts of Japan for Publication No. 02-190833.

Patent Abstracts of Japan for Publication No. 05-072598.

JAPIO Abstract of Publication No. 06-167738.

Patent Abstracts of Japan for Publication No. 06-265971.

Dialog Abstract of Publication No. 07-281250.

Patent Abstracts of Japan for Publication No. 08-043878.

JAPIO Abstract of Publication No. 11-023810.

Patent Abstracts of Japan for Publication No. 11-190866.

Patent Abstracts of Japan for Publication No. 2000-036917.

* cited by examiner

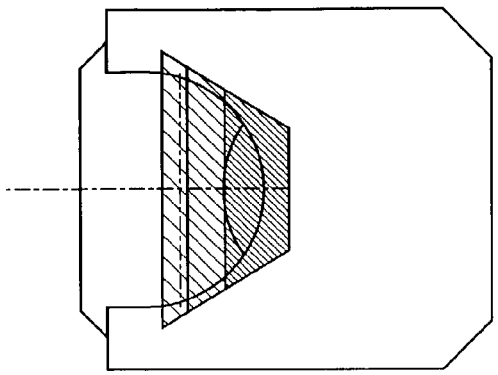
FIG. 1C
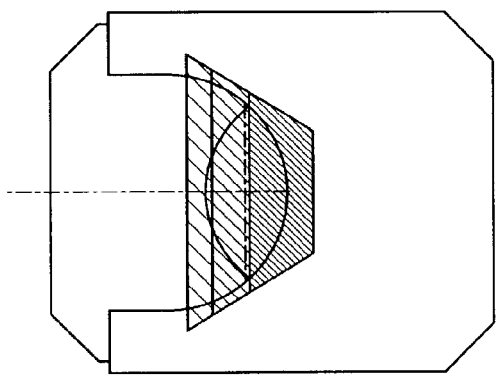
FIG. 1B
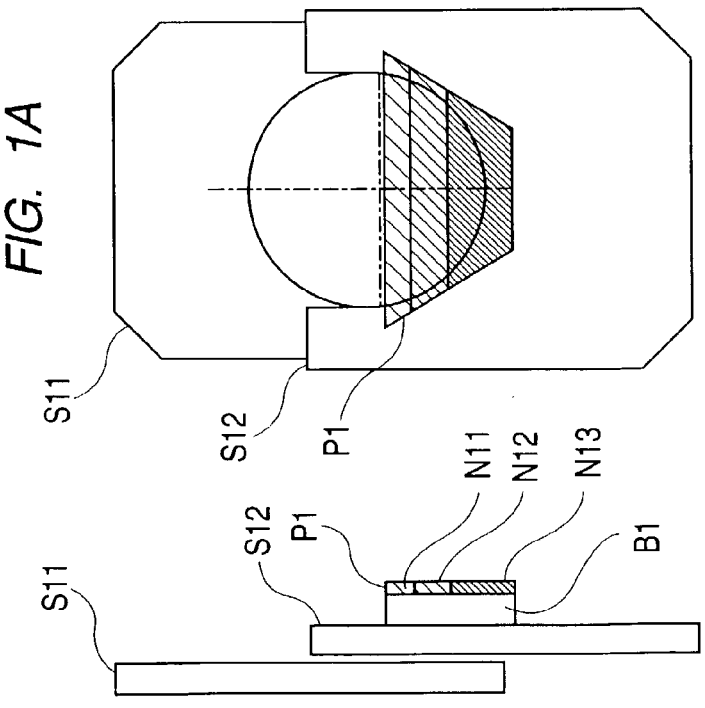
FIG. 1A
FIG. 1D

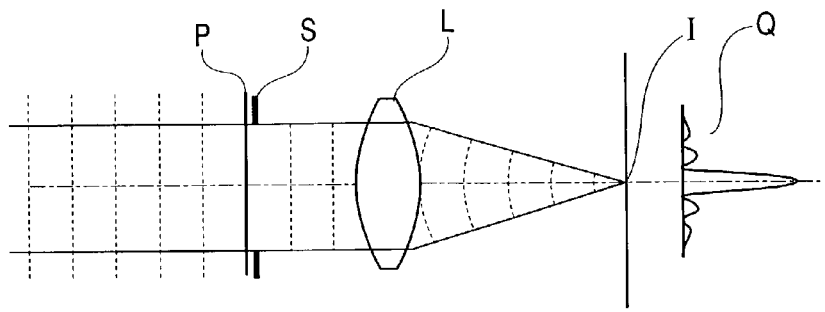
FIG. 15A
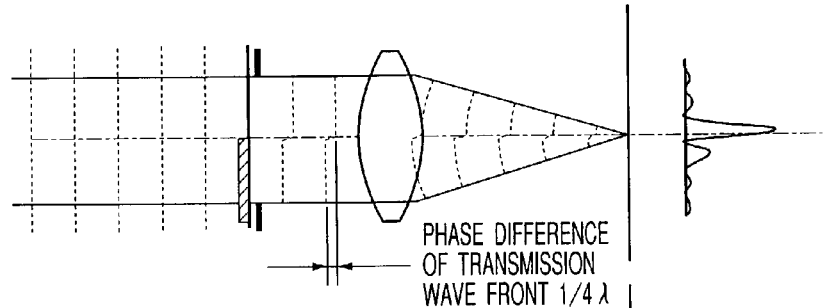
FIG. 15B — PHASE DIFFERENCE OF TRANSMISSION WAVE FRONT 1/4 λ
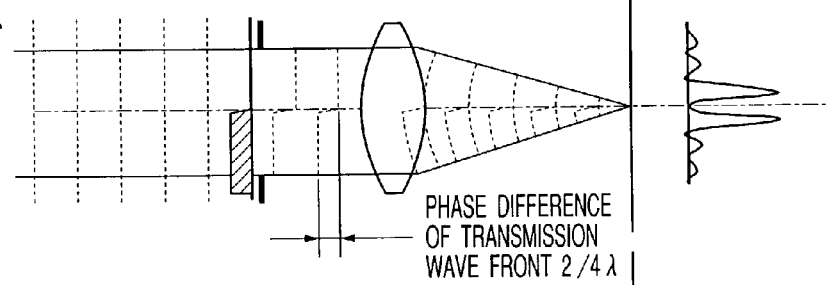
FIG. 15C — PHASE DIFFERENCE OF TRANSMISSION WAVE FRONT 2/4 λ
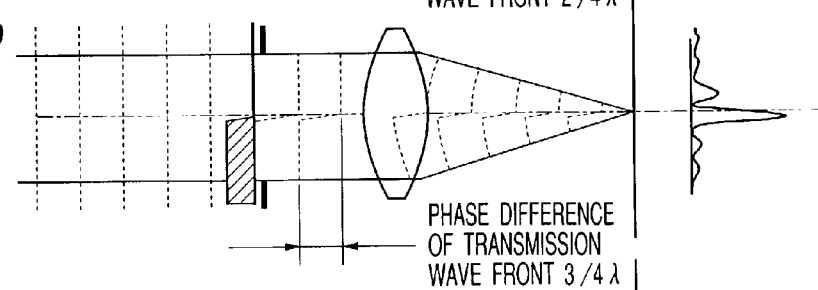
FIG. 15D — PHASE DIFFERENCE OF TRANSMISSION WAVE FRONT 3/4 λ
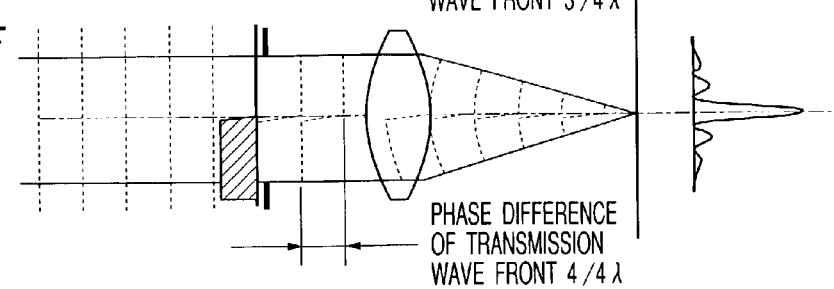
FIG. 15E — PHASE DIFFERENCE OF TRANSMISSION WAVE FRONT 4/4 λ

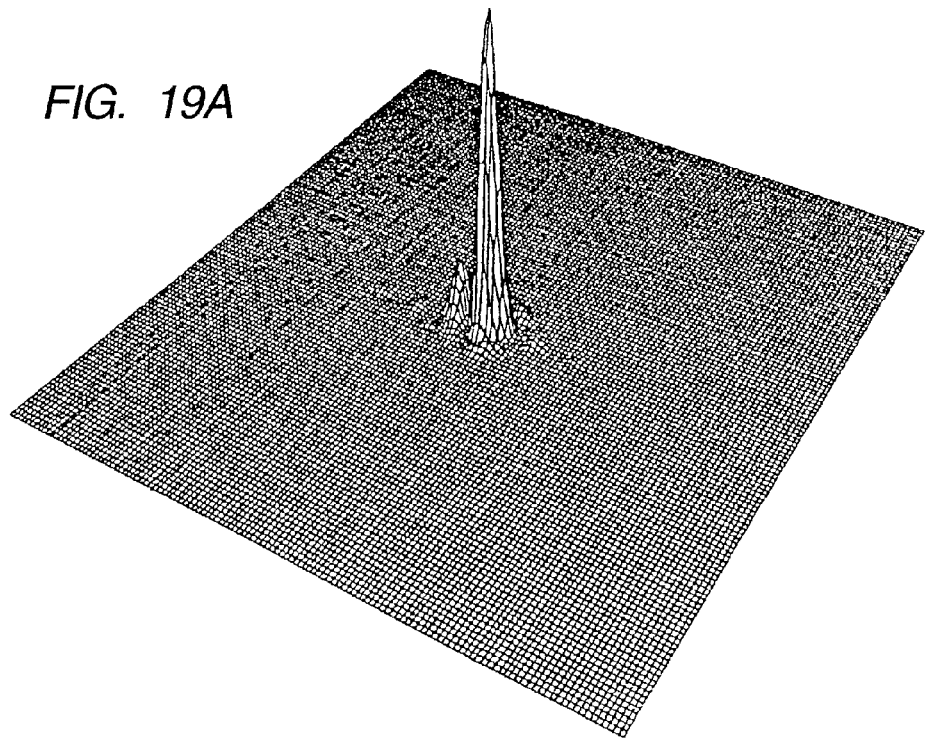
FIG. 19A
FIG. 19B
FIG. 19C
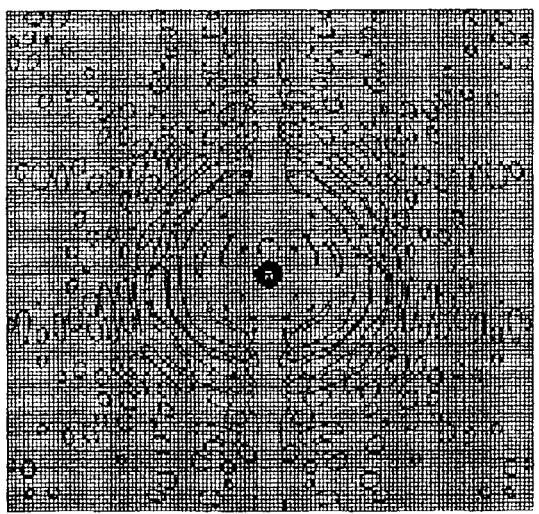
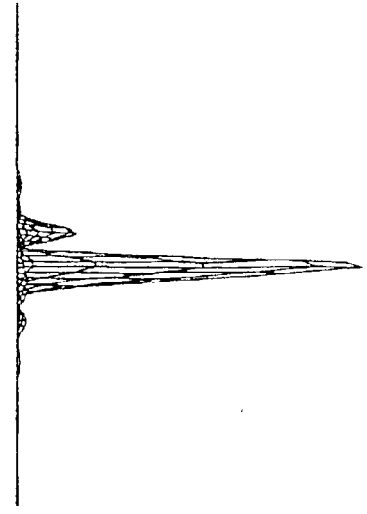

INFLUENCE OF DENSITY DIFFERENCE
AND PHASE DIFFERENCE
(RATIO OF PUTTING BOUNDARY
PORTION ON APERTURE PORTION VS
CHANGE OF MTF)

RATIO OF PUTTING BOURDARY PORTION
ON F4 APERTURE PORTION

LIGHT QUANTITY ADJUSTING DEVICE, OPTICAL SYSTEM HAVING THE SAME, AND IMAGE TAKING APPARATUS

This application is a continuation of International Application No. PCT/JP02/10275, filed Oct. 2, 2002, which claims the benefit of Japanese Patent Application Nos. 315355/2001, filed Oct. 12, 2001, 043121/2002, filed Feb. 20, 2002, and 046361/2002 filed Feb. 22, 2002.

BACKGROUND OF THE INVENTION

1. Field of the Invention

The present invention relates to a light quantity adjusting device suitable for use in an image taking apparatus such as a video camera or a digital still camera, and to a technique capable of suppressing a deterioration of optical performance even in an image pickup element having a small pixel pitch.

2. Related Background Art

For an image taking optical system of an image taking apparatus such as a video camera, a light quantity adjusting device for changing an aperture diameter produced by a plurality of diaphragm blades to adjust a quantity of light is used. In such a diaphragm apparatus, when the aperture diameter becomes too small, the deterioration of optical performance due to light diffraction becomes a problem.

Therefore, in order to prevent the aperture diameter from becoming too small even in the case of an object receiving sufficient light, a light quantity adjusting device using diaphragm blades in combination with an ND (neutral density) filter has been proposed and used in practice.

According to Japanese Patent Publication No. 2592949, a diaphragm apparatus is disclosed in which an ND filter is bonded to diaphragm blades so as to be positioned within an aperture formed by the diaphragm blades and have a plurality of regions for which uniform transmittance is set, and the transmittance is set so as to gradually increase from the outside of the aperture to the inside thereof.

According to Japanese Patent Application Laid-Open No. 52-117127, a diaphragm apparatus is disclosed in which mechanical diaphragm blades are moved during a control from a full open state to a state with a predetermined aperture area, and in small aperture control where the aperture is not larger than a predetermined diaphragm value, an ND filter whose transmittance is continuously changed according to the density is entered into the aperture successively from a filter portion having high transmittance.

In Japanese Patent Application Laid-Open No. 2000-106649, the influence of transmittance of an ND filter having a plurality of density regions on an optical performance is described and an image pickup apparatus having an exposure control mechanism for which measures are taken against the influence is disclosed.

In the cases of these conventional proposals, with respect to the main factor for the deterioration of optical performance in a middle aperture state between a full open aperture state and a small aperture state, it is considered that the influence of diffraction due to a difference of the transmittance of the ND filter covering the aperture portion produced by the diaphragm blades is dominant. Thus, in the case of the ND filter having a plurality of density regions, measures against the influence of diffraction have been proposed with attention to transmittances and areas of the respective regions of the ND filter.

On the other hand, with respect to a factor for the deterioration of optical performance in the middle aperture state, there is not only the influence of diffraction due to a difference of the transmittance of the ND filter but also the influence of a phase difference of transmission wave front resulting from a thickness component of the ND filter.

It has been experimentally known that an optical performance is deteriorated when a part of a diaphragm aperture portion is covered with a filter having a thickness. However, there is known no example in which it is examined as to how the optical performance is influenced by a filter thickness component and specific countermeasures are taken therefor.

According to Japanese Patent Application Laid-Open No. 06-265971, a structure in which an ND filter having a transparent portion and a portion in which transmittance is changed continuously or stepwise is moved in a state in which it covers the entire fixed circular diaphragm aperture, thereby adjusting a quantity of light transmitted, has been proposed as a measure for avoiding the influence of the thickness of the ND filter on the optical performance.

However, the invention according to Japanese Patent Application Laid-Open No. 06-265971 focuses attention on only a large phase difference between a portion in which light passes through a filter member and a portion in which light does not pass through the filter member. Thus, there is no suggestion as to the problem of, and measures against, a minute phase difference of transmission wave front up to about two times larger than a wavelength of light $\lambda$, which results from a change in minute thickness or a change in minute refractive index which will occur in order to provide a change in transmittance when actually realizing an ND filter in which transmittance is changed. According to a study by the present inventor(s), it was found that a minute phase difference of transmission wave front of no more than the order of wavelength of light has a very large influence on the optical performance under certain conditions.

Also, it was found that there is a difference between how the influence of the phase difference of transmission wave front on the optical performance appears and how the influence of a density difference between adjacent regions of the ND filter with different transmittances on the optical performance appears, thus greatly affecting the optical performance under certain conditions by the synergism of the two components, namely the phase difference of transmission wave front and the density difference.

SUMMARY OF THE INVENTION

Therefore, an object of the present invention is to suppress a deterioration of optical performance due to the influence of a minute thickness component of a filter member in a light quantity adjusting device for adjusting a quantity of light using a diaphragm in combination with the filter member for attenuating transmitted light such as an ND filter.

In order to achieve the above object, according to a first aspect of the present invention, in a light quantity adjusting device which includes a diaphragm for forming an aperture and a filter member for attenuating a quantity of light passing through the aperture of the diaphragm and in which a cover ratio of the aperture by the filter member is changed, in a state in which the aperture is completely covered with the filter member, setting is conducted such that a phase difference between lights with a predetermined wavelength $\lambda$ which pass through positions of the filter member with different transmittances becomes substantially $0\lambda$, substantially $1\lambda$, or substantially $2\lambda$.

Here, "the predetermined wavelength" in the first aspect of the present invention is set as appropriate according to a usage state of the light quantity adjusting device. For example, when a center wavelength of a usage wavelength band is used and a visible light region is the usage wavelength band, λ=550 nm is preferable.

In addition, the phase difference of "substantially 0λ, substantially 1λ, or substantially 2λ" means that a phase difference including a manufacturing error is in a range of $\{0\pm(1/5)\}\lambda$, $\{1\pm(1/5)\}\lambda$, or $\{2\pm(1/5)\}\lambda$. If the phase difference is within this range, it is assumed to be a phase difference of substantially 0λ, 1λ, or 2λ, thus adequately achieving an initial object of the present invention.

Also, according to a second aspect of the present invention, in a light quantity adjusting device which includes a diaphragm for forming an aperture and a filter member for attenuating a quantity of light passing through the aperture of the diaphragm and in which a cover ratio of the aperture by the filter member is changed, the device comprises means for setting to a predetermined value a phase difference between lights which pass through positions of the filter member with different transmittances, in a state in which the aperture is completely covered with the filter member.

The light quantity adjusting device according to the first and second aspects of the present invention is suitably used for adjusting the quantity of light passing through an optical system, and suitable for use in an optical system of an image taking apparatus for forming an image on an image pickup element (photoelectric conversion element) such as a CCD or a CMOS in particular.

BRIEF DESCRIPTION OF THE DRAWINGS

In the accompanying drawings:

FIGS. 1A, 1B, 1C and 1D are schematic structural views of a light quantity adjusting device of Embodiment 1;

FIGS. 15A, 15B, 15C, 15D and 15E are diagrams for explaining an influence of a phase difference of transmission wave front on an optical performance;

FIGS. 19A, 19B and 19C show a point image intensity distribution of monochromatic light in the case of a phase difference of (3/4)λ;

DETAILED DESCRIPTION OF THE PREFERRED EMBODIMENTS

Figure 2:
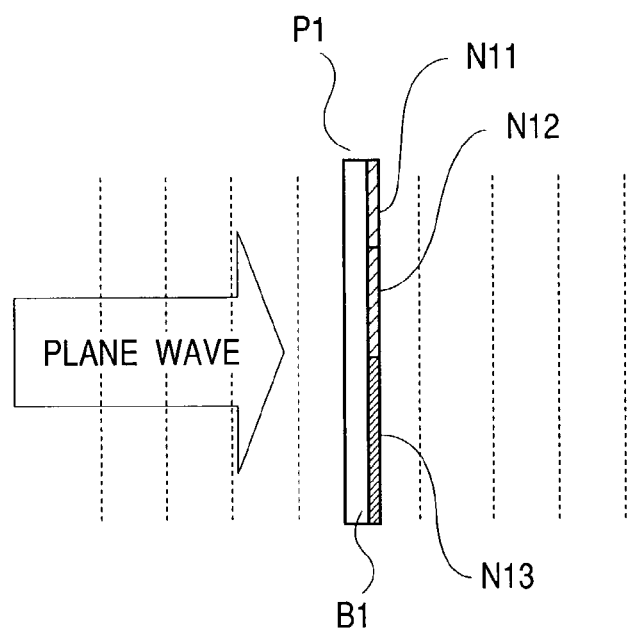
FIG. 2 shows a state of a phase of a wave front passed through an ND filter of the light quantity adjusting device of Embodiment 1.

Before the description of a light quantity adjusting device (diaphragm device) of this embodiment mode, an influence of a phase difference of transmission wave front on an image will be described.

First, an optical phenomenon produced when a part of a diaphragm aperture portion is covered with a filter having a thickness will be described using FIGS. 15A, 15B, 15C, 15D and 15E.

FIGS. 15A, 15B, 15C, 15D and 15E show point image intensity distributions Q around a geometrical-optical imaging point I when is a filter P and an aperture diaphragm S are located in front (the object side) of a stigmatic ideal lens L and a parallel light beam which is a plane wave of monochromatic light with a wavelength λ is incident.

FIG. 15A shows a state in which a thickness of the filter P is zero and a transmission wave front is not influenced thereby. In this case, the intensity distribution Q becomes a diffraction pattern according to a relationship between an F number F and the wavelength λ of a light beam (reference: "Wave Front Optics for Lens Design", Tohru Kusakawa, Tokai University Press).

When the diaphragm S is a circular aperture, a single point image with a radius of 1.22 Fλ is imaged and a diffraction light pattern of ring-shaped weak light is formed in its vicinities. Here, when a thickness of a region (lower side in the drawing) of the filter P corresponding to a half of the aperture produced by the diaphragm S is increased by a minute quantity and setting is conducted such that a phase difference of transmission wave front becomes (1/4)λ as shown in FIG. 15B, a point image with a small intensity appears beside the point image with a strong intensity.

When the thickness of the lower side region of the filter P is further increased and setting is conducted such that the phase difference of transmission wave front becomes (2/4)λ; as shown in FIG. 15C, the intensity distribution Q does not become a single point image but becomes an intensity distribution including two point images which are separated from each other in a vertical direction in the drawing. This is because, of lights focused into the geometrical-optical imaging point I, a phase of a wave front of light passing through an upper side half region of pupil in the drawing is shifted from that of a wave front of light passing through a lower side half region in the drawing by (1/2)λ;, thereby producing a wave-optical canceling phenomenon of waves so that the intensity on the imaging point I becomes zero. On the other hand, there are no cases where energies of lights to be focused into the imaging point I are lost because of the conservation of energy. Thus, they are dispersed in a vertical direction in the drawing with respect to the imaging point I and converged at two points.

When the thickness of the lower side region of the filter P is further increased and setting is conducted such that the phase difference of transmission wave front becomes (3/4)λ as shown in FIG. 15D, the intensity of an upper side image of the two point images becomes weaker and the intensity of an lower side image becomes stronger.

When the thickness of the lower side region of the filter P is further increased and setting is conducted such that the phase difference of transmission wave front becomes (4/4)λ as shown in FIG. 15E, the intensity distribution Q becomes a diffraction pattern of a single point image again so that it is returned to the same state as in FIG. 15A.

When the thickness of the lower side region of the filter P is further increased, a change in intensity distribution Q is periodically repeated according to the phase difference of the transmission wave front.

With respect to an interval Δy between the two point images which are separated from each other at the time when the phase difference of transmission wave front is (1/2)λ as shown in FIG. 15C, there is a relationship of Δy≅2Fλ, and it is proportional to an F number and a wavelength λ. For example, in the case of the F number F=4 and the wavelength λ=550 nm, the interval Δy between the two point images becomes approximately 4.4. This means that, according to the same principle as a two-point separate low pass filter, there is produced the same effect as in the case of using a low pass filter with a cutoff frequency of 1/(2Δy)=114 lines/mm, and an MTF of an optical system is deteriorated.

A stigmatic ideal lens is set by optical calculation and results obtained by calculating point image intensity distributions in the states shown in FIGS. 15A, 15B, 15C, 15D and 15E are shown in FIGS. 16A, 16B and 16C, 17A, 17B and 17C, 18A, 18B and 18C, 19A, 19B and 19C, and 20A, 20B and 20C. FIGS. 16A, 16B and 16C, 17A, 17B and 17C, 18A, 18B and 18C, 19A, 19B and 19C, and 20A, 20B and 20C show point image intensity distributions in the case where a filter thickness is increased such that a phase difference of transmission wave front in a half region of the diaphragm aperture is increased from (0/4)λ to (4/4) λ in increments of (1/4)λ under a condition of a circular diaphragm in which a wavelength λ of monochromatic light is 550 nm and an F number F is 2. In FIGS. 16A, 16B and 16C, 17A, 17B and 17C, 18A, 18B and 18C, 19A, 19B and 19C, and 20A, 20B and 20C, symbols "A", "B", and "C" indicate a bird's-eye view, a plan view and a side view of the point image intensity distribution, respectively (FIGS. 21A, 21B and 21C, 22A, 22B and 22C, 23A, 23B and 23C, 24A, 24B and 24C, 25A, 25B and 25C, 26A, 26B and 26C, 27A, 27B and 27C, 28A, 28B and 28C, and 29A, 29B and 29C which are shown later are also the same).

It is also found from FIGS. 16A, 16B and 16C, 17A, 17B and 17C, 18A, 18B and 18C, 19A, 19B and 19C, and 20A, 20B and 20C that, in the case of monochromatic light with a single wavelength, the intensity distribution of the imaging point I is periodically changed according to the phase difference of transmission wave front which occurs due to a change in filter thickness.

Now, light actually used for an image taking system is not monochromatic light but white light in which lights having various wavelengths are mixed. FIGS. 21A, 21B and 21C, 22A, 22B and 22C, 23A, 23B and 23C, 24A, 24B and 24C, and 25A, 25B and 25C show results obtained by calculating point image intensity distributions of while light under the same condition as set in FIGS. 16A, 16B and 16C, 17A, 17B and 17C, 18A, 18B and 18C, 19A, 19B and 19C, and 20A, 20B and 20C. Note that, for while light, color weight having a sensitivity peak near 550 nm in a visible light range of 400 nm to 700 nm is set corresponding to spectral luminous efficiency.

With respect to a change in point image intensity distribution when the phase difference of transmission wave front is zero λ to 1λ at the wavelength λ of 550 nm, it is found from FIGS. 21A, 21B and 21C, 22A, 22B and 22C, 23A, 23B and 23C, 24A, 24B and 24C, and 25A, 25B and 25C that also in the case of while light, a single point image is divided into two and then the two point images are changed again into a single point image substantially in the same manner as in the case of monochromatic light.

Figure 23A:
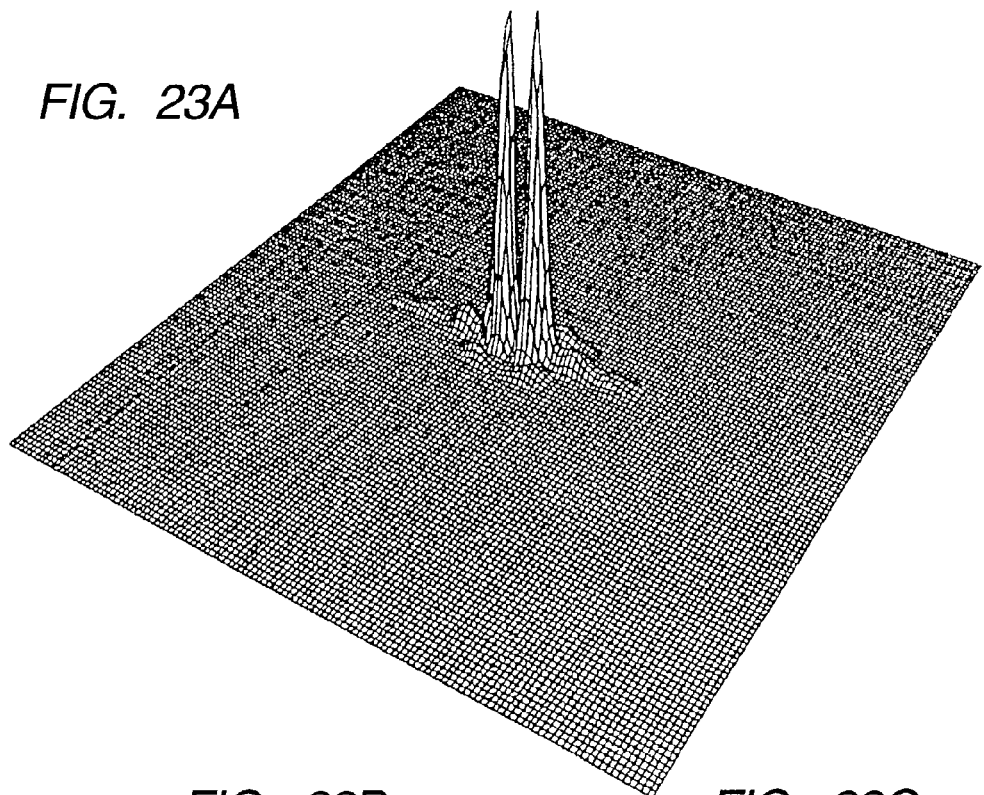
FIGS. 23A, 23B and 23C show a point image intensity distribution of white light in the case of a phase difference of (2/4)λ.
Figure 23B:
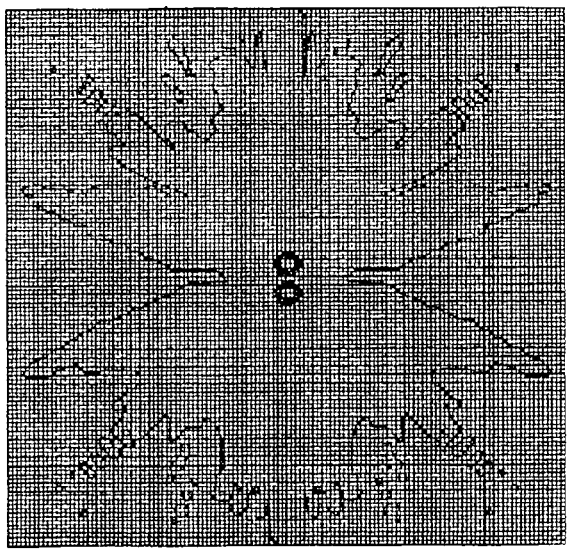
Figure 23C:
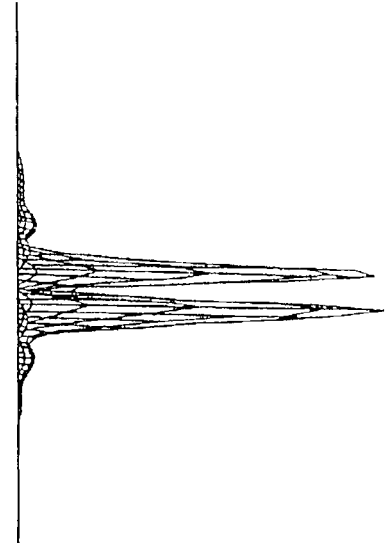
Figure 24A:
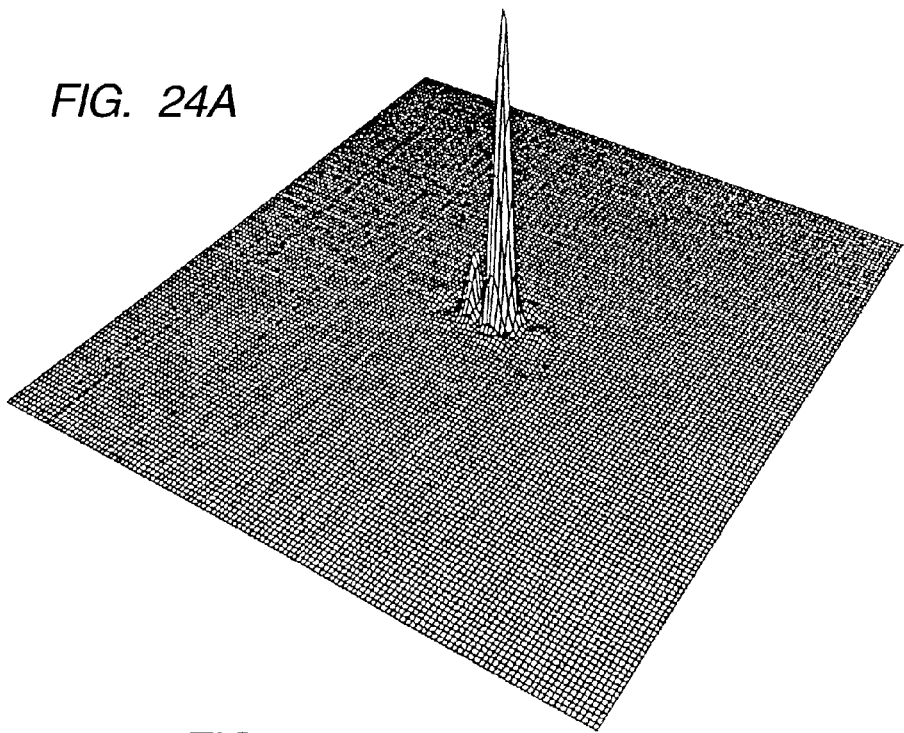
FIGS. 24A, 24B and 24C show a point image intensity distribution of white light in the case of a phase difference of (3/4)λ.
Figure 24B:
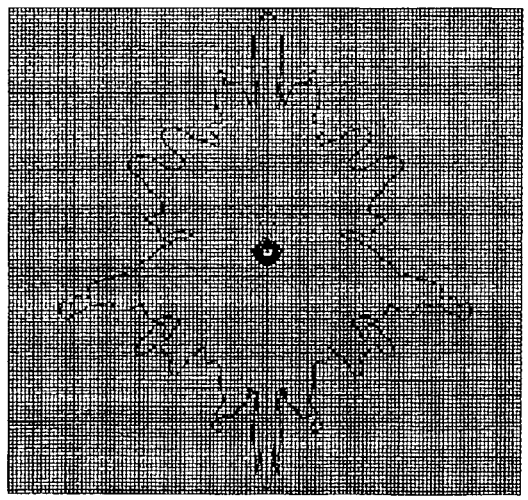
Figure 24C:
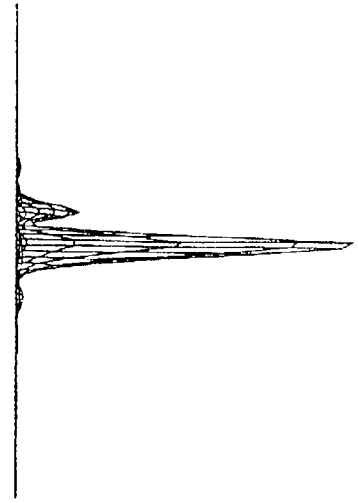

FIGS. 23A, 23B and 23C show a state in which the intensity distribution of white light becomes a two-point separate image when the phase difference of transmission wave front is (1/2)λ; at the wavelength λ of 550 nm. As described earlier, a separate width between the two point separate images is proportional to the F number and the wave length λ, so that the separate width becomes large between two point separate images of red light having a long wavelength, whereas the separate width becomes small between two point separate images of blue light having a short wavelength. Therefore, the two point separate images of white light as shown in FIGS. 23A, 23B and 23C becomes an image with color bleeding. In the case of monochromatic light, the intensity of a valley portion located at the midpoint between the two point separate images become zero. However, in the case of white light, the intensity of the valley portion does not becomes zero due to the influence of color bleeding.

Figure 25A:
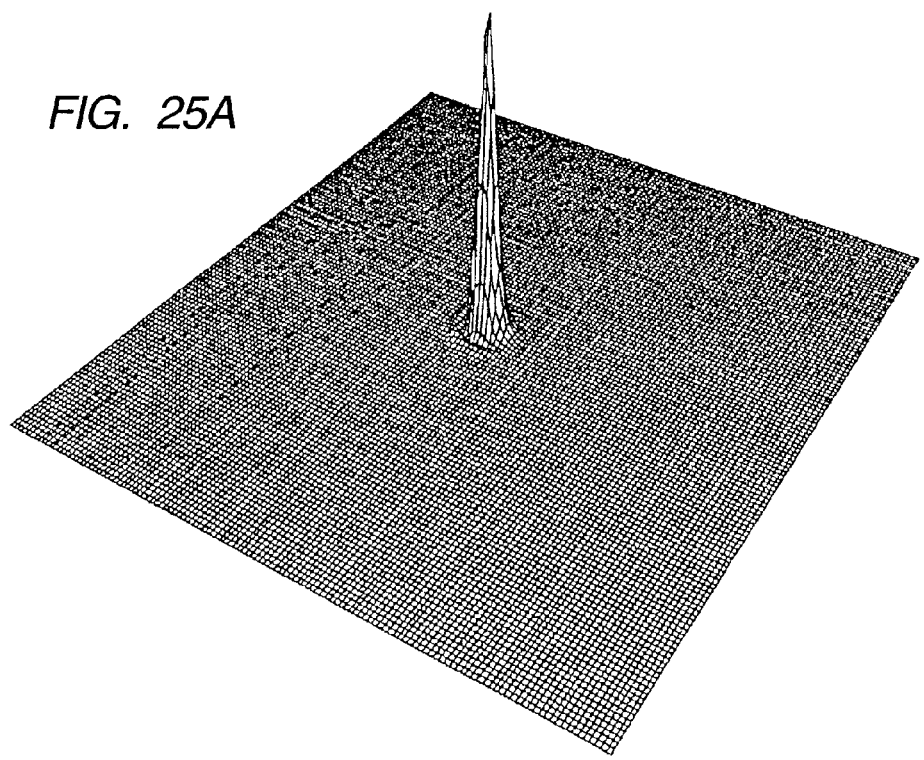
FIGS. 25A, 25B and 25C show a point image intensity distribution of white light in the case of a phase difference of (4/4)λ.
Figure 25B:
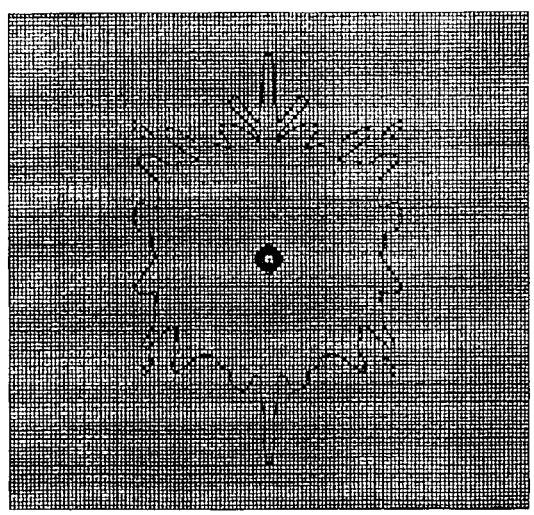
Figure 25C:
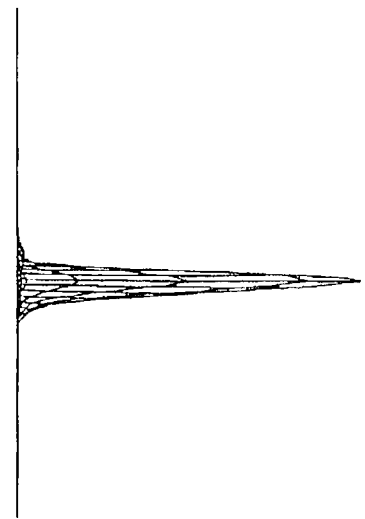

FIGS. 25A, 25B and 25C show the point image intensity distribution of white light when the phase difference of transmission wave front is just $(4/4)\lambda = 1\lambda$ at the wavelength $\lambda$ of 550 nm. A phase difference of lights passing through the filter is changed according to the wavelength and phase differences among all wavelengths of white light do not become $1\lambda$. Thus, as is apparent from FIG. 25B, the point image intensity distribution becomes not a complete circular form but an elliptical form which is slightly extended in a vertical direction.

Thus, in the case of while light, if the phase difference of transmission wave front is within a relatively small region of substantially $2\lambda$ or less, the intensity distribution of the imaging point I periodically becomes a single point image or two point images as in the case of monochromatic light. However, if the phase difference of transmission wave front is within a large region of several $\lambda$ or more, a variation in phase difference of transmission wave front due to the wavelength becomes larger so that a behavior different from that in the case of monochromatic light is indicated with respect to the point image intensity distribution. This will be described below.

FIGS. 26A, 26B and 26C, 27A, 27B and 27C, 28A, 28B and 28C, and 29A, 29B and 29C show results obtained by calculating a difference between the point image intensity distribution of monochromatic light and that of white light when the phase differences of transmission wave front of $5.5\lambda$ and $6\lambda$ are produced at the wavelength $\lambda$ of 550 nm.

Figure 26A:
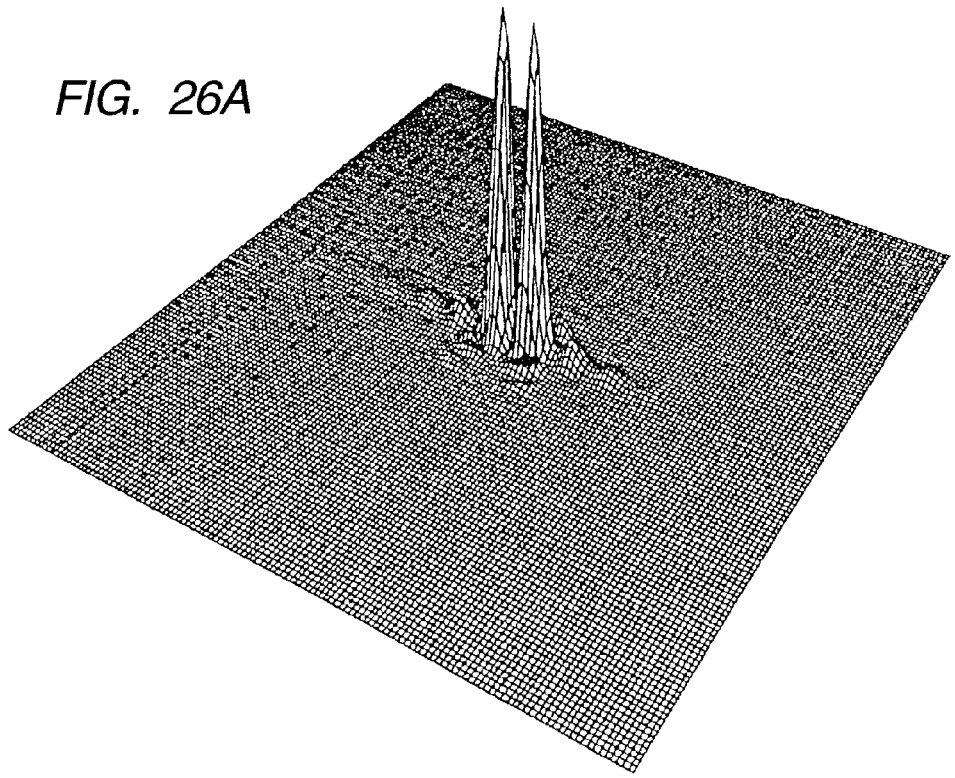
FIGS. 26A, 26B and 26C show a point image intensity distribution of monochromatic light in the case of a phase difference of 5.5λ.
Figure 26B:
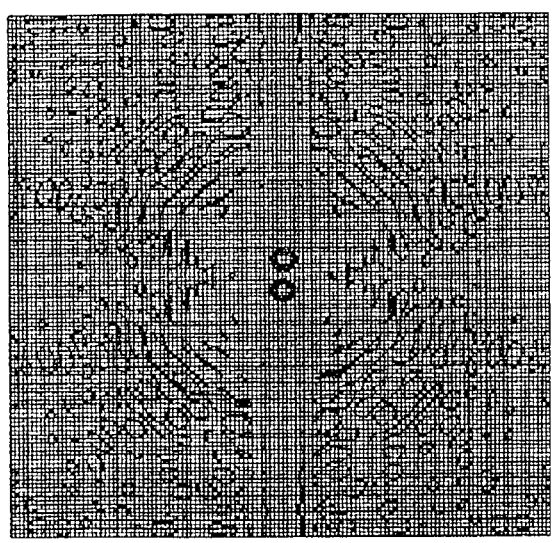
Figure 26C:
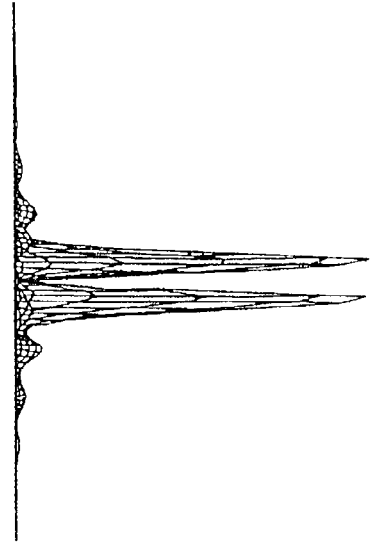
Figure 27A:
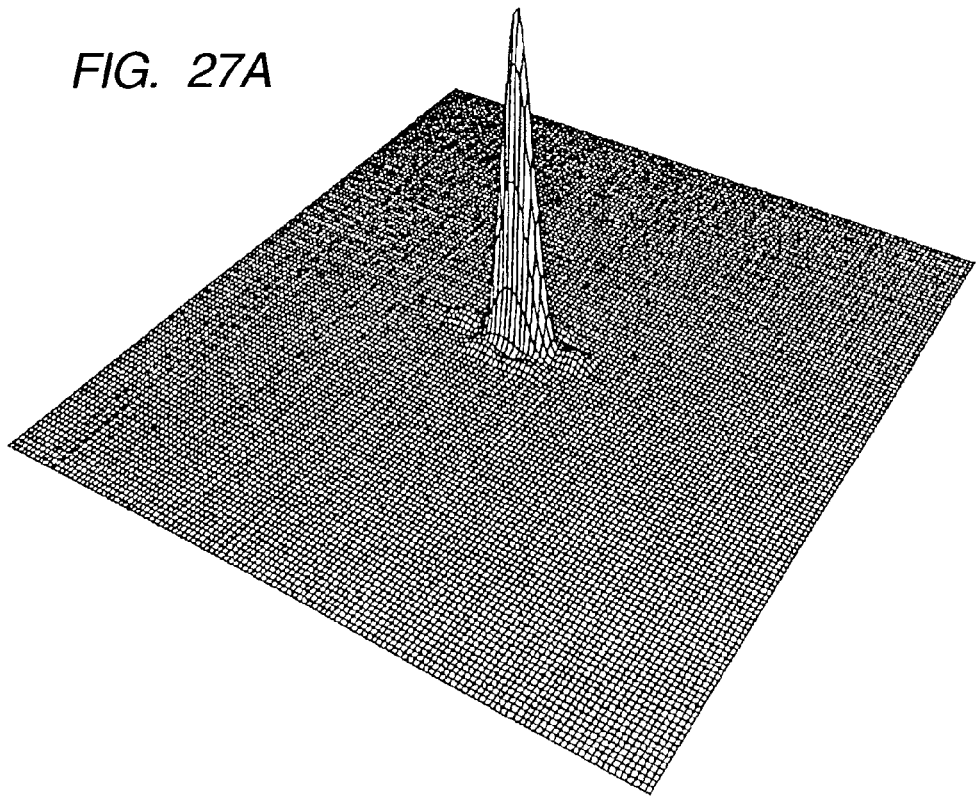
FIGS. 27A, 27B and 27C show a point image intensity distribution of white light in the case of a phase difference of 5.5λ.
Figure 27B:
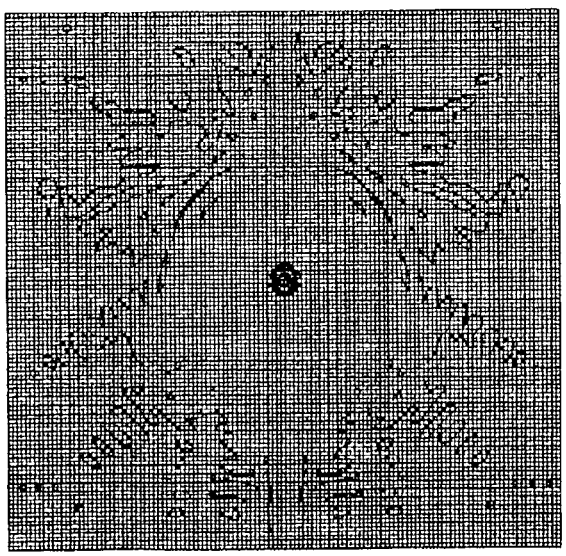
Figure 27C:
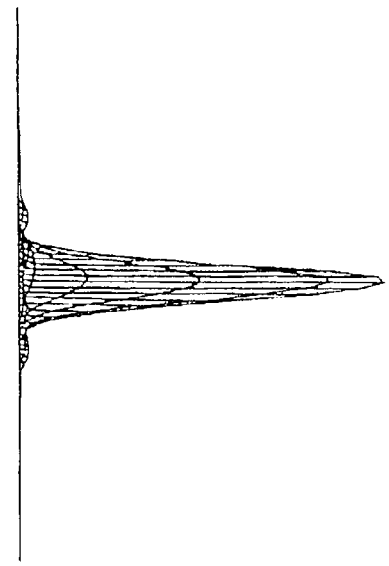

FIGS. 26A, 26B and 26C show the point image intensity distribution of monochromatic light produced under a condition in which the monochromatic light is used and the phase difference is $5.5\lambda$, and FIGS. 27A, 27B and 27C show the point image intensity distribution of white light.

Figure 28A:
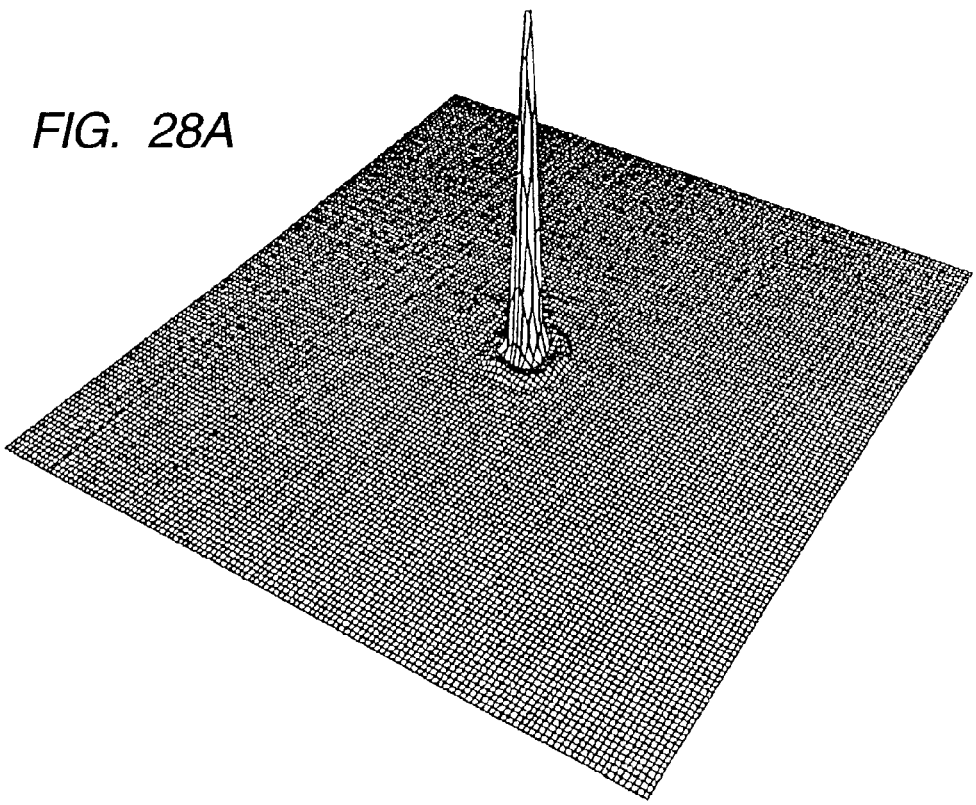
FIGS. 28A, 28B and 28C show a point image intensity distribution of monochromatic light in the case of a phase difference of 6.0λ.
Figure 28B:
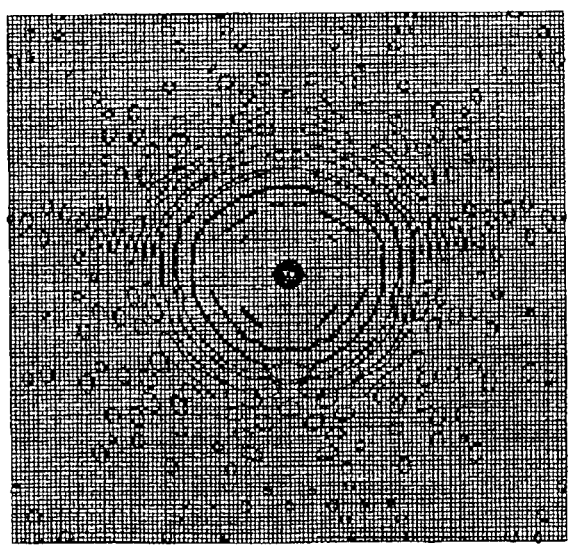
Figure 28C:
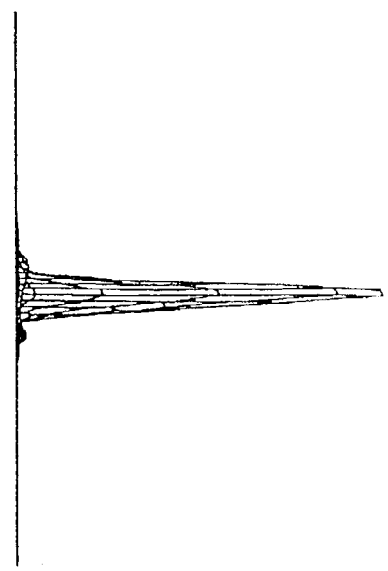
Figure 29A:
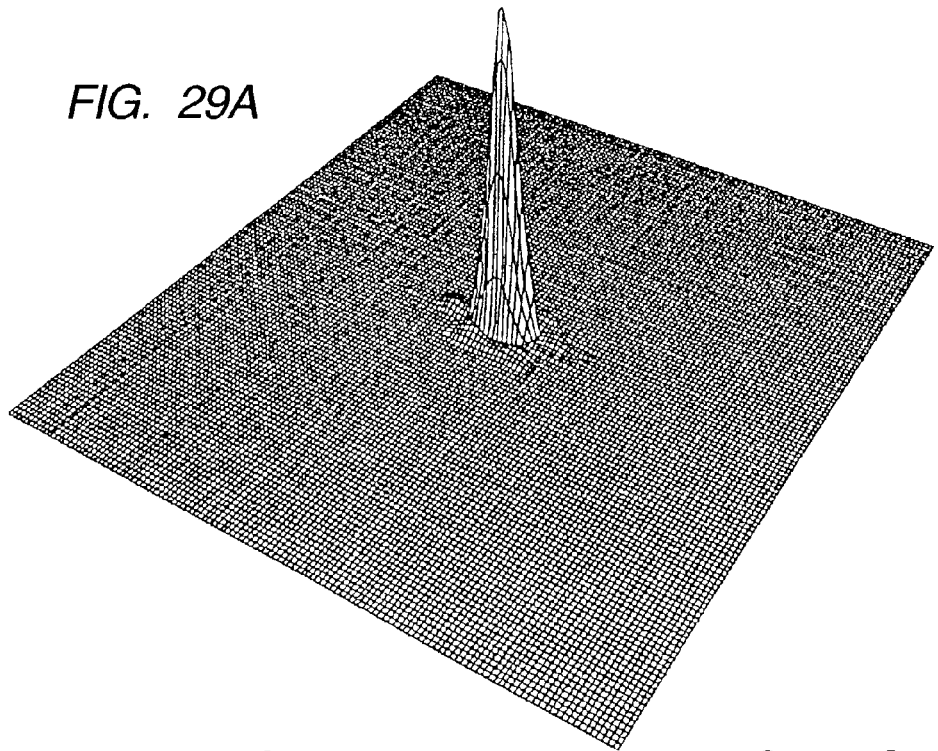
FIGS. 29A, 29B and 29C show a point image intensity distribution of white light in the case of a phase difference of 6.0λ.
Figure 29B:
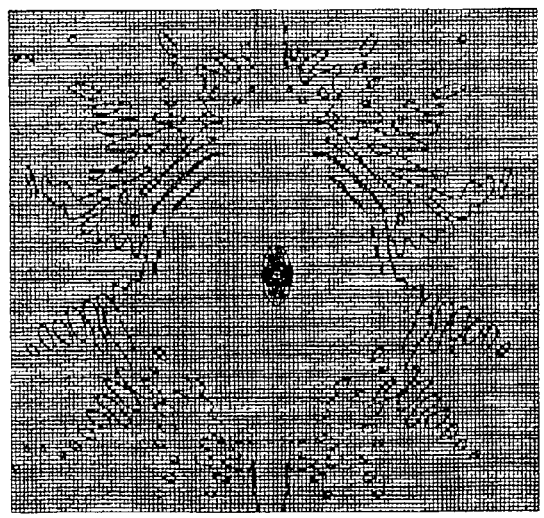
Figure 29C:
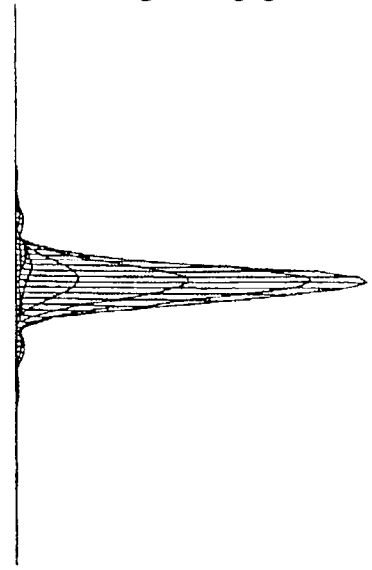

FIGS. 28A, 28B and 28C show the point image intensity distribution of monochromatic light produced under a condition in which the monochromatic light is used and the phase difference is $6\lambda$, and FIGS. 29A, 29B and 29C show the point image intensity distribution of white light.

In the case of the monochromatic light and the phase difference of transmission wave front of $5.5\lambda$, a phase is shifted by $(1/2)$ as shown in FIGS. 26A, 26B and 26C. Thus, as in the case of FIGS. 18A, 18B and 18C, the intensity distribution including two separated point images is obtained. However, the two point images are not obtained in the case of white light. In the other words, not all the phase differences between the respective wavelengths become a $(1/2)$ phase and a phase difference becomes larger according to the wavelength. Therefore, the intensity distribution of a single point image with an elliptical form extended in a direction in which a phase difference is produced (vertical direction in FIGS. 27A, 27B and 27C) is obtained as shown in FIGS. 27A, 27B and 27C.

Next, when the case of the phase difference of transmission wave front of $6\lambda$ is examined, phases are just matched in the case of monochromatic light. Thus, the intensity distribution of a single point image with a circular form is obtained as shown in FIGS. 28A, 28B and 28C. In the case of white light, the intensity distribution with an elliptical form extended in a direction in which a phase difference is produced (vertical direction in FIGS. 29A, 29B and 29C) is obtained as shown in FIGS. 29A, 29B and 29C.

When the intensity distribution shown in FIGS. 27A, 27B and 27C is compared with that shown in FIGS. 29A, 29B and 29C, it is apparent that, in the case of white light, there is almost no change in the point image intensity distribution even if the phase difference of transmission wave front is changed from $5.5\lambda$ to $6\lambda$. This indicates that in the case of white light, the influence of the phase difference of transmission wave front on an optical performance greatly differs between the case where the phase difference of transmission wave front at a pupil plane which is a diaphragm aperture is small at substantially $2\lambda$ or less and the case where it is larger at $5\lambda$ or more.

In a light quantity adjusting device using an ND filter, a region in which the phase difference of transmission wave front is substantially $2\lambda$ or less means a phase difference produced due to a thickness such as that of an optical thin film on an ND filter substrate in a state in which the aperture is completely covered with the ND filter substrate. In this region, when the phase difference of transmission wave front is changed from $i\lambda$ ($i=0, 1$) to $(i+(1/2))\lambda$, the optical performance is rapidly deteriorated. When it is changed from $(i+(1/2))\lambda$ to $(i+1)\lambda$, the optical performance is restored somewhat.

On the other hand, a region in which the phase difference of transmission wave front is $5\lambda$ or more means for example a phase difference produced due to a thickness of an ND filter substrate itself in a state in which the diaphragm aperture is partially covered with an edge portion of the ND filter substrate. In this region, even if the phase difference of transmission wave front is somewhat varied, the optical performance is not greatly changed.

In relation to this, a relationship between an MTF value used for optical performance evaluation and a phase difference of transmission wave front will be described using FIGS. 30A and 30B. Here, the influence of diffraction resulting from the transmittance of the ND filter is not considered and the description will be advanced while directing attention only to a change in MTF value according to a phase difference of transmission wave front resulting from a thickness component of the filter.

Figure 30A:
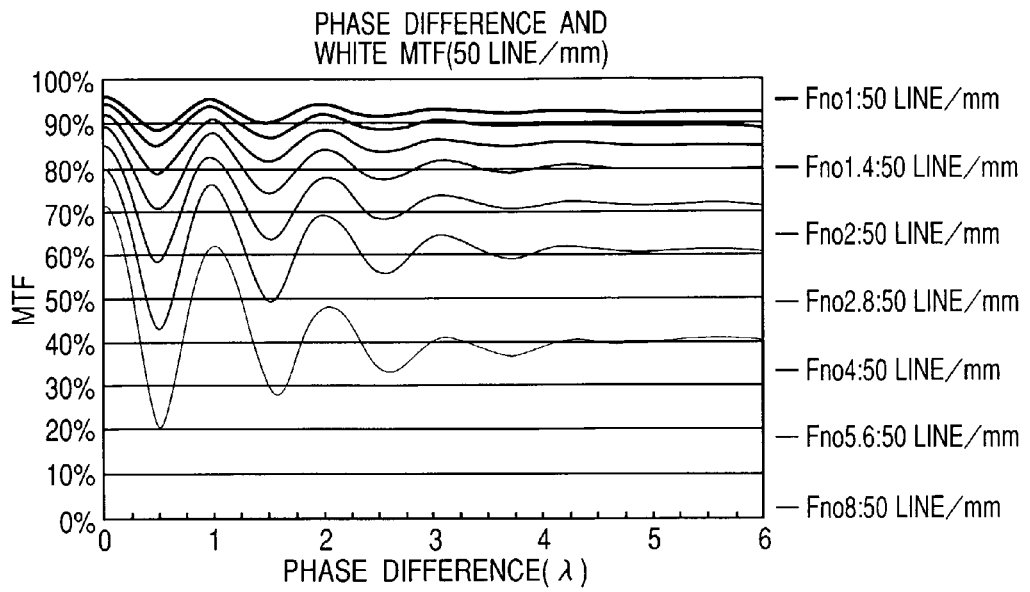
FIGS. 30A and 30B are graphs showing a relationship between a white MTF value at spatial frequencies of 50 lines/mm and 100 lines/mm and a phase difference of transmission wave front.
Figure 30B:
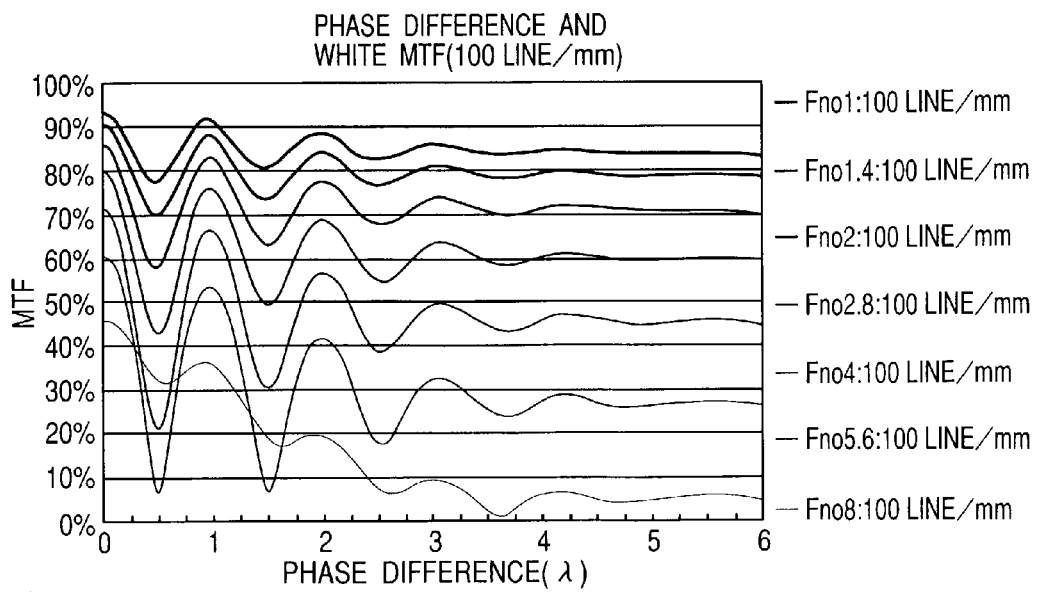

FIGS. 30A and 30B show wave-optical MTF values of white light in a stigmatic ideal lens system when a filter thickness in a lower half region of a diaphragm aperture is gradually increased from zero to change a phase difference of transmission wave front up to $6\lambda$.

FIG. 30A is a graph showing white MTF values at a spatial frequency of 50 lines/mm and FIG. 30B is a graph showing white MTF values at a spatial frequency of 100 lines/mm. The ordinate of the graph indicates an MTF value and the abscissa indicates a phase difference of transmission wave front at a wavelength $\lambda = 550$ nm. Respective MTF values in states in which the F numbers of the circular aperture are F1, F1.4, F2, F2.8, F4, F5.6, and F8 are indicated in the graphs.

Here, a spatial frequency to be evaluated by MTF calculation will be described. When a pixel pitch of an image pickup element is "p" μm, a threshold spatial frequency resolvable by the image pickup element is $1/(2 \times p)$. Generally, a frequency higher than the vicinity of the threshold spatial frequency is cut by a low pass filter because it causes a moiré or a false color signal. The spatial frequency important for image quality evaluation is about a half of the threshold frequency of the image pickup element.

Thus, (evaluation spatial frequency)$=1/(4 \times p)$ is defined. Therefore, when the pixel pitch of the image pickup element is 5 μm, the evaluation spatial frequency is set to 50 lines/mm. In addition, when the pixel pitch is 2.5 μm, the evaluation spatial frequency is set to 100 lines/mm.

For example, in the case of an image pickup element for video camera in which the number of effective pixels is 380,000 and a screen diagonal size of a light receiving element is 4.5 mm, when the pixel pitch is about 5 μm, the evaluation spatial frequency becomes 50 lines/mm. When the evaluation spatial frequency is converted into a vertical direction television resolution, it corresponds to 270 TV lines. In the case of an image pickup element in which the number of effective pixels is the same and the screen diagonal size of the light receiving element is 2.25 mm, when the pixel pitch is about 2.5 μm, the evaluation spatial frequency becomes 100 lines/mm. Also in this case, when the evaluation spatial frequency is converted into the vertical direction television resolution, it corresponds to 270 TV lines.

Now, the description will return to the influence of the phase difference of transmission wave front on the optical performance.

A target MTF value at the evaluation spatial frequency is provisionally set to 70% or more. Note that in the MTF calculation performed here, the target MTF value is provisionally set to a somewhat high value because the transmittance of the ND filter is neglected and by considering the fact that a stigmatic ideal lens system is used. However, this value is to be taken only as a guide and not an absolute numerical target.

First, a description will be made with respect to a white MTF value at the spatial frequency of 50 lines/mm as shown in FIG. 30A.

When the phase difference of transmission wave front is zero λ in a state in which the aperture is narrowed down to F8, the MTF value is kept to 72%. However, when the phase difference of transmission wave front becomes (1/2)λ, the MTF value abruptly drops down to 21%. When the phase difference of transmission wave front is further increased, the MTF value is restored up to 62% in a state where it is 1 λ. When the phase difference of transmission wave front is further increased, the MTF value is varied while oscillating. When the phase difference of transmission wave front is 5λ or more, the MTF value becomes stable at about 42%. In order to satisfy a target MTF value in a state of F8, it is required that the phase difference of transmission wave front is set to the vicinity of substantially zero λ.

In a state of F5.6, when the phase difference of transmission wave front is zero λ, the MTF value is kept to 80%. However, when the phase difference of transmission wave front is (1/2)λ, the MTF value is decreased to 44%. When the phase difference of transmission wave front is 1λ, the MTF value is restored up to 76%. After that, while the MTF value is oscillated, it becomes stable at about 61% when the phase difference of transmission wave front is 5 λ or more.

In a state of F4, when the phase difference of transmission wave front is zero λ, the MTF value is 85%. When the phase difference of transmission wave front is (1/2)λ, the MTF value is decreased to 58%. When the phase difference of transmission wave front is 1λ, the MTF value is restored up to 82%. After that, while the MTF value is oscillated, it becomes stable at about 72% when the phase difference of transmission wave front is 5λ or more.

In a state of F2.8, when the phase difference of transmission wave front is zero λ, the MTF value is kept to 90%. In addition, even when the phase difference of transmission wave front is (1/2)λ, the MTF value is kept to 71%. When the phase difference of transmission wave front is 1λ, the MTF value is restored up to 88%. After that, while the MTF value is oscillated, it become stable at about 80% when the phase difference of transmission wave front is 5λ or more.

In the case of a diaphragm aperture state allowing higher light level than F2.8, the MTF value never drops below 70% due to the influence of the phase difference of transmission wave front.

Next, white MTF values at a spatial frequency of 100 lines/mm as shown in FIG. 30B will be described.

In the case of a state in which the aperture is narrowed down to F8, the MTF value is decreased to 45% because of the influence of diffraction. When the phase difference of transmission wave front is 5 or more, the MTF value is decreased to about 5%. Thus, in a state of F8, it is impossible to satisfy a target MTF value.

In a state of F5.6, when the phase difference of transmission wave front is zero λ, the MTF value is decreased to 61%. In addition, when the phase difference of transmission wave front is (1/2)λ, the MTF value is decreased to 6%. When the phase difference of transmission wave front is 1λ, the MTF value is restored up to 53%. After that, while the MTF value is oscillated, it becomes stable at about 27% when the phase difference of transmission wave front is 5λ or more. Even in the state of F5.6, the influence of diffraction is large so that the target MTF value cannot be satisfied.

In a state of F4, when the phase difference of transmission wave front is zero λ, the MTF value is kept to 72%. However, when the phase difference of transmission wave front is (1/2)λ, the MTF value is decreased to 21%. When the phase difference of transmission wave front is 1λ, the MTF value is restored up to 66%. After that, while the MTF value is oscillated, it becomes stable at about 45% when the phase difference of transmission wave front is 5λ or more. In order to satisfy the target MTF value in a state of F4, it is required that the phase difference of transmission wave front is set to the vicinity of zero λ. Thus, when the ND filter is moved within the diaphragm aperture state of F4, a large phase difference of transmission wave front is produced due to the thickness of the filter so that the target MTF value cannot be satisfied.

In a state of F2.8, when the phase difference of transmission wave front is zero λ, the MTF value is kept to 80%. However, when the phase difference of transmission wave front is (1/2), the MTF value is decreased to 43%. When the phase difference of transmission wave front is 1λ, the MTF value is restored up to 76%. After that, while the MTF value is oscillated, it becomes stable at about 60% when the phase difference of transmission wave front is 5 λ or more.

In a state of F2, when the phase difference of transmission wave front is zero λ, the MTF value is kept to 85%. However, when the phase difference of transmission wave front is (1/2) λ, the MTF value is decreased to 58%. When the phase difference of transmission wave front is 1λ, the MTF value is restored up to 73%. After that, while the MTF value is oscillated, it becomes stable at about 71% when the phase difference of transmission wave front is 5 X or more.

In a state of F1.4, when the phase difference of transmission wave front is zero λ, the MTF value is kept to 90%. However, when the phase difference of transmission wave front is (1/2)λ, the MTF value is decreased to 70%. When the phase difference of transmission wave front is 1λ, the MTF value is restored up to 88%. After that, while the MTF value is oscillated, it becomes stable at about 89% when the phase difference of transmission wave front is 5 λ or more.

In a state where the filter is moved into the diaphragm aperture portion and the filter edge portion is located in the central portion of the aperture, the phase difference of transmission wave front is 5λ or more. In this state of the phase difference of transmission wave front, when the evaluation spatial frequency is 50 lines/mm, even if the aperture is narrowed down to F4, the MTF value can be kept to 70%. On the other hand, when the evaluation spatial frequency is 100 lines/mm, unless the aperture is widened up to F2, the MTF value of 70% cannot be attained.

With respect to the ND filter, a type in which an organic coloring matter or pigment absorbing light is mixed in a material and they are kneaded and a type in which an optical thin film is formed on the surface of the material by evaporation have been known. The advantage of the kneading type ND filter is that a large number of filters with a uniform density can be processed at a low cost. However, it has wavelength dependency of spectral transmittance which is inferior as compared with the evaporation type ND filter. Thus, for the ND filter used as a diaphragm device for an image taking apparatus, the evaporation type is superior. For the evaporation type ND filter, less wavelength dependency of spectral transmittance and a function as an antireflection film can be provided by laminating a plurality of metallic films or dielectric films (Reference: "Design, manufacturing, and Evaluation Technique for Optical Thin Film", Technical Information Association).

Figure 31:
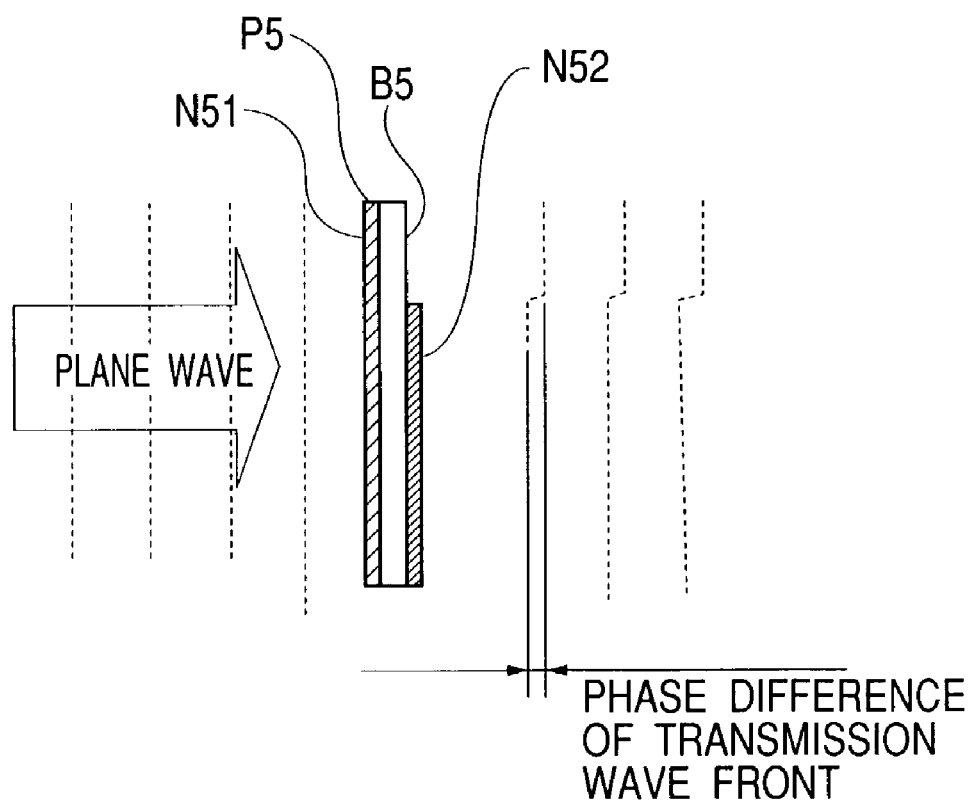
FIG. 31 shows a state of a phase of a wave front passed through a conventional ND filter.
Figure 32A:
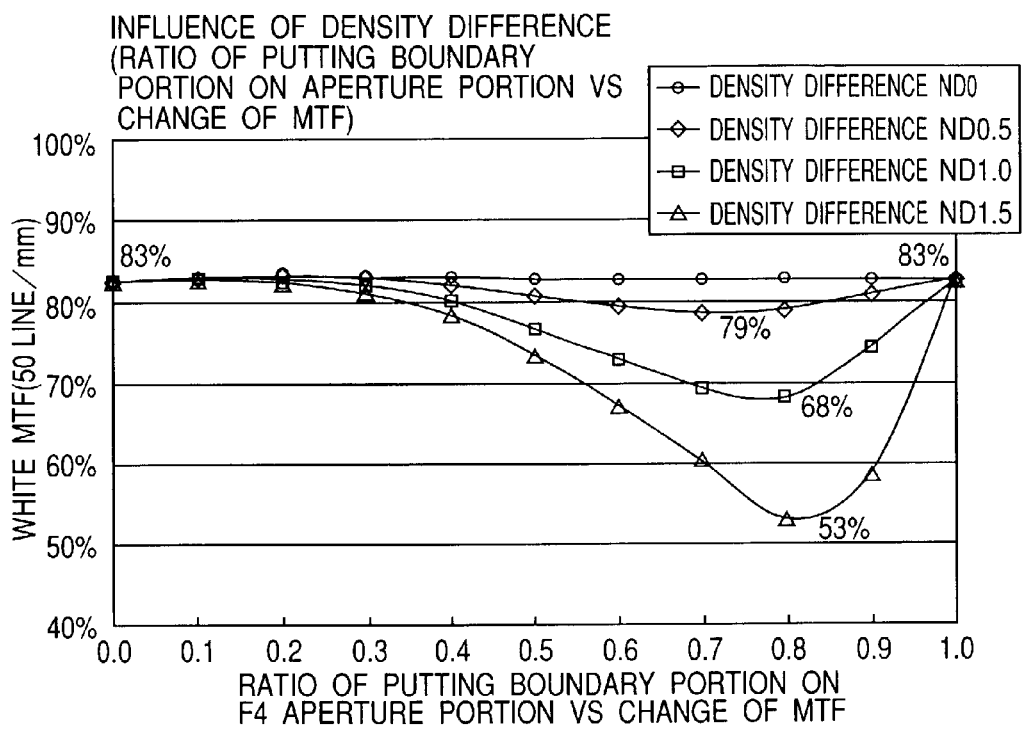
FIGS. 32A, 32B, 32C, 32D, 32E and 32F show a quantity of putting a boundary portion with a density difference, on an aperture portion in a diaphragm aperture state of F4 and a change of MTF.
Figures 32B, 32C, 32D, 32E, 32F:
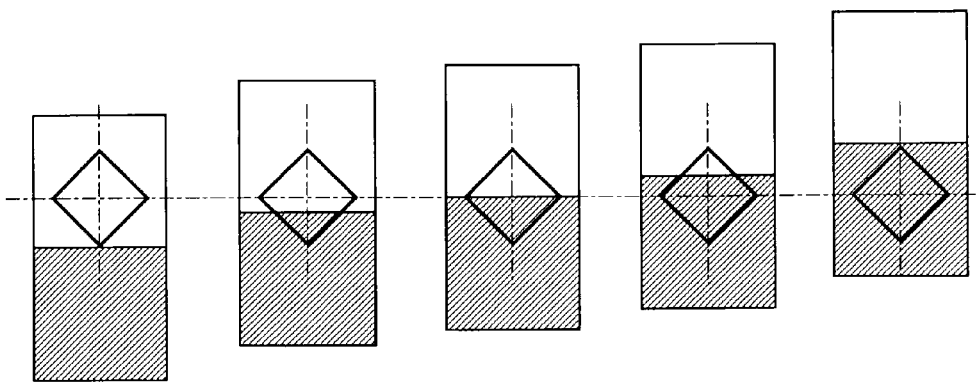
Figure 33A:
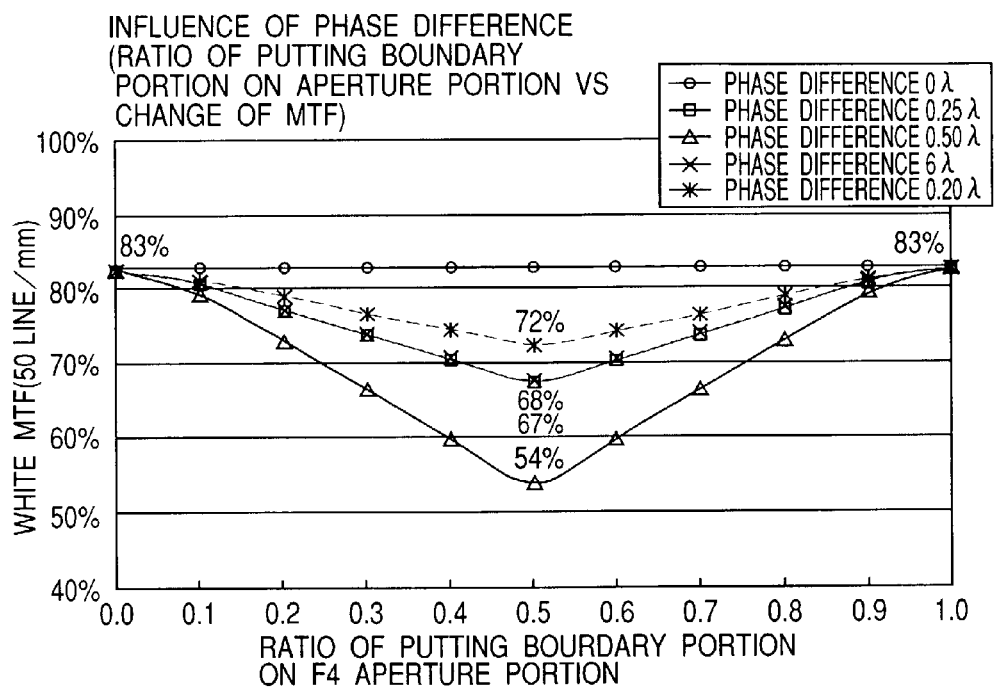
FIGS. 33A, 33B, 33C, 33D, 33E and 33F show an quantity of putting a boundary portion with a phase difference, on an aperture portion in a diaphragm aperture state of F4 and a change of MTF.
Figures 33B, 33C, 33D, 33E, 33F:
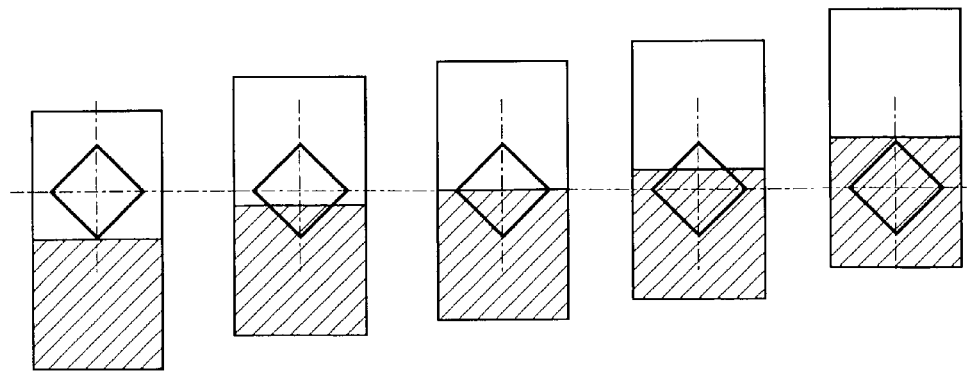
Figure 34A:
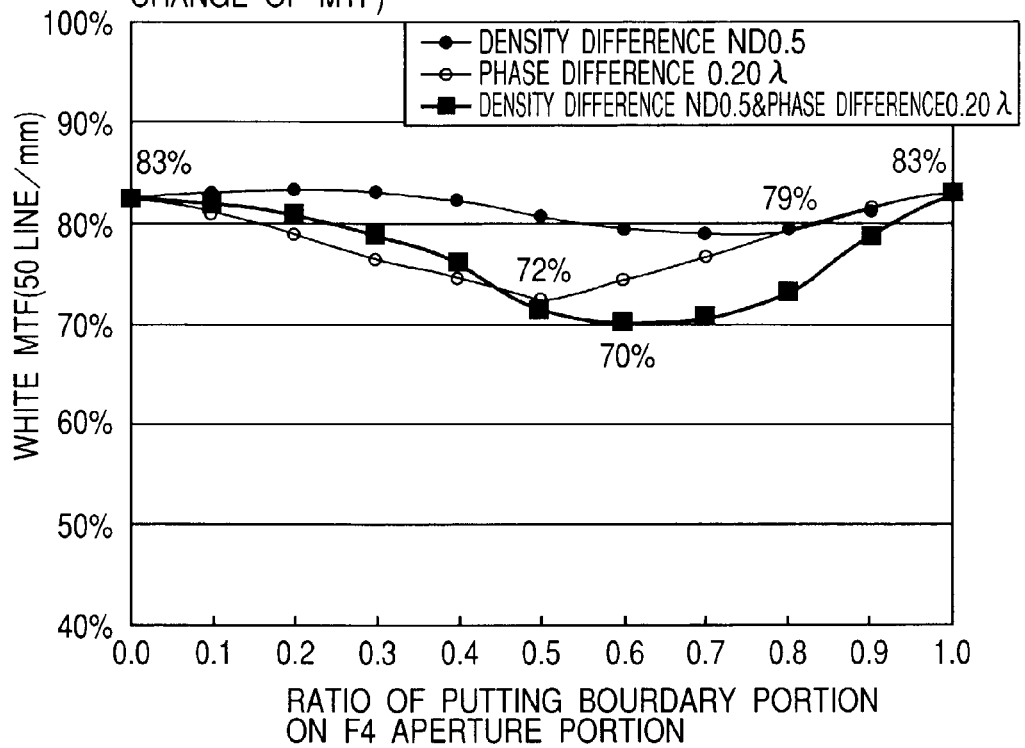
FIGS. 34A, 34B, 34C, 34D, 34E and 34F show a quantity of putting a boundary portion with both a density difference and a phase difference, on an aperture portion in a diaphragm aperture state of F4 and a change of MTF.
Figures 34B, 34C, 34D, 34E, 34F:
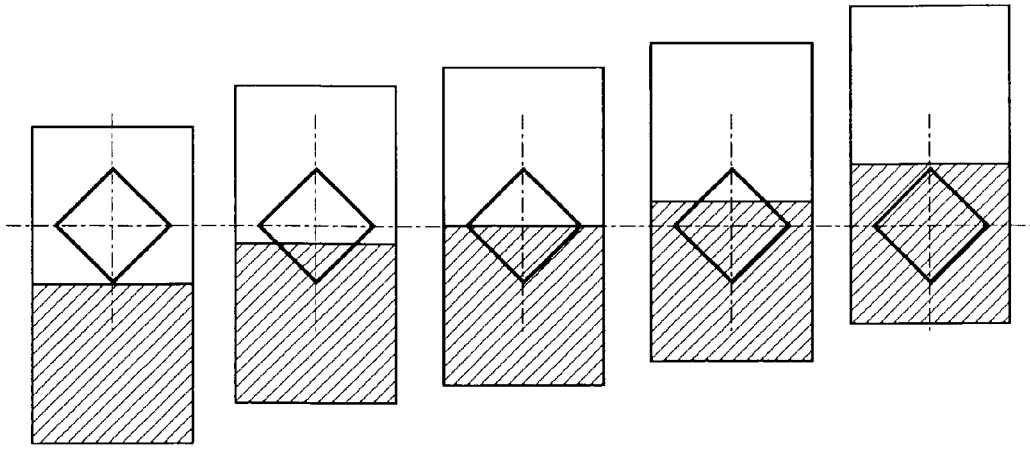

FIG. 31 shows an example in which the density is set stepwise for a plurality of regions by using an evaporation type ND filter. In the drawing, reference symbol P5 denotes an evaporation type ND filter which has two kinds of density regions. According to this example, an ND film N51 is formed on the entire surface of a filter substrate B5 by evaporation and an ND film N52 is formed by evaporation on the rear surface thereof over a region having a different area. In this case, as shown in the drawing, a phase difference of transmission wave front resulting from a step formed due to the ND film is produced in an ND evaporation film boundary portion of the rear surface.

In FIGS. 30A and 30B, a region in which a phase difference of transmission wave front is 2λ or less means the case where there is a minute phase difference of transmission wave front resulting from the step due to the film thickness or the like.

Next, the influence of a density difference on an optical performance, the influence of a phase difference of transmission wave front on the optical performance, and the influence of the synergism of both the density difference and the phase difference of transmission wave front on the optical performance will be described with respect to the case where the diaphragm aperture portion is gradually covered with the ND filter.

As a simplified model, assumed is a state in which a stigmatic ideal lens is used and the diaphragm aperture portion has a shape in which a square is slanted by 45 degrees, and the aperture is reduced to F4. A boundary with a density difference, a boundary where a phase difference of transmission wave front is produced, or a boundary where the both are present in the ND filter is continuously moved relative to the diaphragm aperture so that a state in which the diaphragm aperture is covered with a high density (low transmittance) region, a region with a predetermined thickness, or a region with both is set on calculation. In FIGS. 32A, 32B, 32C, 32D, 32E and 32F, 33A, 33B, 33C, 33D, 33E and 33F, 34A, 34B, 34C, 34D, 34E and 34F, "A" indicates white MTF calculation values at a spatial frequency of 50 lines/mm when a ratio of putting the boundary region described above on the aperture portion is changed from 0 to 1.0 in increments of 0.1, and "B" to "F" each indicate a ratio of putting a boundary portion on the aperture portion corresponding to "A".

FIGS. 32A, 32B, 32C, 32D, 32E and 32F show calculation values when only a density difference is set for regions before and after the boundary and the density difference is set to 0, 0.5, 1.0, and 1.5. Here, a relationship between the density and the transmittance is "(density)=−log (transmittance)". Thus, the density of 0.0 corresponds to the transmittance of 100%, the density of 0.5 corresponds to the transmittance of 32%, the density of 1.0 corresponds to the transmittance of 10%, and the density of 1.5 corresponds to the transmittance of 3%.

It is apparent that the MTF value becomes the minimum when the diaphragm aperture portion is covered with the high density region by 70% to 80%, due to a density difference between regions before and after the boundary. This is because an aperture shape of a low density (high transmittance) portion which is formed by the diaphragm blades and the boundary with a density difference becomes a small diaphragm aperture state and the deterioration of the MTF value is caused by the influence of diffraction.

Also, the deterioration of the MTF value is less at about a density difference of 0.5. Even in a state in which the diaphragm aperture portion is covered with the high density region by 70% to 80%, 70% or more of a target can be sufficiently kept. On the other hand, when the density difference exceeds 0.5, the MTF value starts to greatly deteriorate. In a state in which the diaphragm aperture portion is covered with the high density region by 70% to 80%, the MTF value is 68% at the density difference of 1.0 and the MTF value is rapidly reduced to 53% at the density difference of 1.5.

FIGS. 33A, 33B, 33C, 33D, 33E and 33F show calculation values in a state in which only a phase difference of transmission wave front is set for regions before and after the boundary and the phase difference is 0λ, 0.25λ, 0.5λ, 6λ and 0.2λ.

It is apparent that the MTF value becomes minimum, due to a phase difference of transmission wave front between regions before and after the boundary, when the diaphragm aperture portion is covered with one region with a predetermined phase difference against the other region with the two regions sandwiching the boundary by just 50% (in a state in which areas of the aperture portion occupied by respective regions before and after the boundary are equal to each other). In addition, in the state of 50% coverage, when the cases where the phase difference is 0λ, 0.25λ, and 0.5λ are compared, the MTF value is decreased as the phase difference increases. Thus, a change in MTF value due to a change in phase difference indicates a behavior in which it is periodically changed up to the phase difference of about 2λ and kept to a substantially constant value in a range of 5λ or more, as described earlier in FIGS. 30A and 30B.

In FIGS. 33A, 33B, 33C, 33D, 33E and 33F, when the MTF values at phase differences of 0.25λ and 6λ are compared, they are substantially equal to each other. This means that, between the case where a phase difference of transmission wave front resulting from a film thickness of an evaporation film is 1/4λ and the case where a large phase difference of transmission wave front resulting from a thickness of an ND filter substrate is produced, the optical performance is affected to substantially the same degree.

Next, the influence of the synergism of both a density difference and a phase difference of transmission wave front between regions before and after the boundary on the optical performance will be described.

FIGS. 34A, 34B, 34C, 34D, 34E and 34F show MTF calculation values in the case where a density difference of 0.5 and a phase difference of transmission wave front of 0.2λ are independently set for regions before and after the boundary, and the case where the both are set simultaneously.

As described above, the influence of the density difference on the MTF value becomes maximum when the diaphragm aperture portion is covered with the high density region by 70% to 80%. On the other hand, the influence of the phase difference of transmission wave front on the MTF value is maximized in a state in which areas of the aperture portion occupied by regions before and after the boundary are equal to each other. When such two conditions are simultaneously produced, FIGS. 34A, 34B, 34C, 34D, 34E and 34F show that, as a result of the synergism, the influence on the optical performance becomes maximum when the aperture portion is covered by about 60% to 70%.

As described above using FIGS. 32A, 32B, 32C, 32D, 32E and 32F, 33A, 33B, 33C, 33D, 33E and 33F, and 34A, 34B, 34C, 34D, 34E and 34F, even when only the density difference of the regions before and after the boundary is suppressed to be small, if the phase difference is large, the optical performance is deteriorated. Alternatively, when only the phase difference is suppressed to be small, if the density difference is large, the optical performance is deteriorated. Thus, in order to minimize the deterioration of the optical performance, it is necessary to set the phase difference of transmission wave front and the density difference in a balanced manner.

In the following specific embodiments of the invention, there will be disclosed a structure for keeping the phase difference of transmission wave front and/or the density difference between adjacent regions in a suitable range to minimize the deterioration of the optical performance.

Embodiment 1

Embodiment 1 of the present invention is shown in FIGS. 1A, 1B, 1C and 1D. FIGS. 1A, 1B, 1C and 1D show an embodiment of a light quantity adjusting device (diaphragm device) to which the present invention is applied. FIG. 1A shows a full open aperture state, FIG. 1B shows a middle aperture state, FIG. 1C shows a minimum aperture state, and FIG. 1D is a side view of FIG. 1A.

In the drawings, reference symbols S11 and S12 denote diaphragm blades for forming a diaphragm aperture and an aperture area can be changed by relatively moving them. Reference symbol P1 denotes an ND filter (filter member) which is attached to the diaphragm blade S12 and fixed thereto. Thus, an area of the aperture covered with the ND filter P1 is changed as the diaphragm blades S11 and S12 are relatively moved. In addition, with respect to the ND filter P1, a smallest transmittance (heavy density) region N13, a second-smallest transmittance (middle transmittance) region N12, and a largest transmittance (light density) region N11 are formed on a substrate B1 in order from the aperture vicinity side of the diaphragm blade S12 to the inside. A synthetic resin film made of cellulose acetate, polyethylene terephthalate (PET), vinyl chloride, acrylic resin, or the like is used for the substrate B1. A main reason for using the synthetic resin film is used is that specific gravity is light and it is hard to break even in the case of processing into a thin film. A thickness of the substrate B1 is about 100 µm to 50 µm.

FIG. 2 shows a state of a transmission wave front passing through the ND filter portion P1. With respect to the respective density regions N11, N12, and N13 in FIG. 2, respective transmittances are set using the evaporation films such that a density difference between the region N11 and the region N12 and a density difference between the region N12 and the region N13 each become 0.5 or less. Film thicknesses of the respective density regions and refraction indexes of materials therefor are set as appropriate so that a phase difference of transmission wave front including a manufacturing error becomes $(1/5)\lambda$ or less. When the ND filter ((average refraction index of multi-layer film)≅1.63) disclosed in JP 07-063915 A is assumed, the phase difference of transmission wave front that is $(1/5)\lambda$ or less corresponds to an actual step (mechanical step) of the respective density regions, which is 0.17 µm or less.

Figure 3:
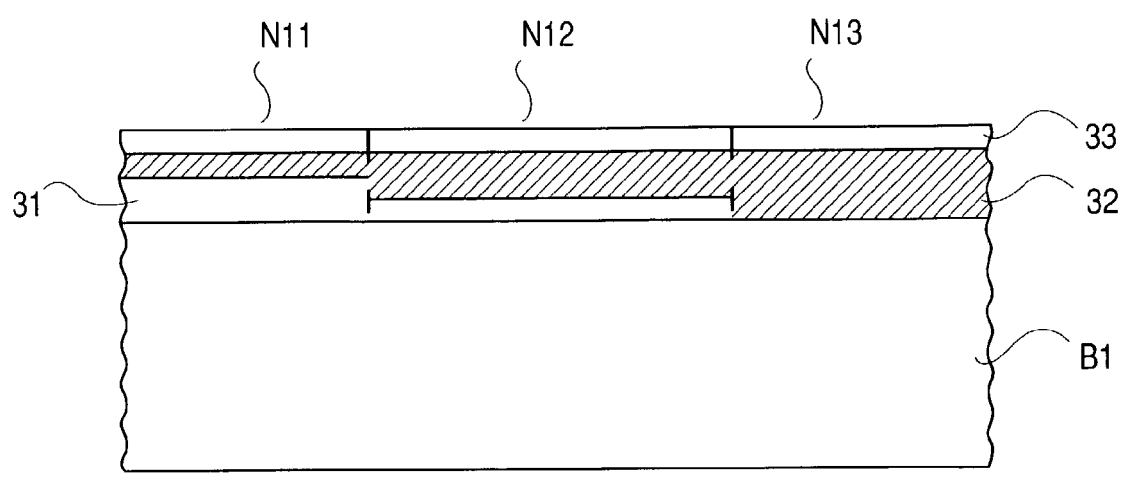
FIG. 3 is an enlarged sectional view of the ND filter of Embodiment 1.

As shown in FIG. 3, the respective regions N11 and N12 of the ND filter P1 have three functional evaporation layers on the film-like substrate B1. In other words, there are a base coating layer 31 for correcting a phase difference of transmission wave front, an ND layer 32 for uniformly reducing transmittance without depending on a wavelength, and an AR coating layer 33 for preventing surface reflection. The region N13 has the ND layer 32 and the AR coat layer 33 without having the base coat layer 31.

With respect to the base coat layer 31 for correcting the phase difference of transmission wave front, a film thickness of a dielectric film which is made of $Al_2O_3$, $SiO_2$, or the like and has a refraction index close to that of the substrate B1 is suitably set and it is formed on the substrate B1 by evaporation to correct the phase difference of transmission wave front. The ND layer 32 for reducing the transmittance is made from a multi-layer film and provided so as to reduce wavelength dependency. A thickness of the ND layer 32 is changed to change transmittance for the respective regions N11, N12, and N13. This becomes a main factor for a phase difference of transmission wave front. The base coat layer 31 is used for correcting this. The AR coat layer 33 for preventing surface reflection is formed as a final layer by evaporation. The AR coat layer 33 is obtained by forming a dielectric film made of $MgF_2$ or the like by evaporation.

When the relationships between the phase difference of transmission wave front and the white MTF as shown in FIGS. 30A and 30B are referred to, if the phase difference of transmission wave front exceeds $(1/5)\lambda$, the MTF value is rapidly deteriorated. In a state in which the phase difference of transmission wave front is $(1/4)\lambda$ to $(3/4)\lambda$, the MTF value is decreased as compared with a state in which the phase difference of transmission wave front of $5\lambda$ or more is produced. This is particularly remarkable in a state with a large F number (state with a small diaphragm aperture). In a state with a small F number (state with a large diaphragm aperture), the deterioration of the MTF value is relatively less as compared with a state in which there is completely no phase difference of transmission wave front.

In this embodiment, as shown in FIG. 1A, the state in which the edge portion of the ND filter P1 which has a thickness of several µm or more is located within the diaphragm aperture corresponds to the state in which the phase difference of transmission wave front of $5\lambda$ or more is produced. However, in the case of a small F number as shown in FIG. 1A, setting is conducted so as to obtain such a state. Thus, the deterioration of the optical performance is suppressed to a level in which no problem is caused in practice.

On the other hand, in the case of a large F number as shown in FIGS. 1B and 1C, setting is conducted such that the entire aperture is covered with the ND filter P1. In addition to this, setting is conducted such that the phase difference of transmission wave front of lights passing through positions of the ND filter P1 at which transmittances are different becomes $(1/5)\lambda$ or less. Thus, the deterioration of the optical performance can be suppressed.

Note that, in this embodiment, setting is conducted such that the phase difference of transmission wave front becomes $(1/5)\lambda$ or less, that is, in the vicinity of $0\lambda$. However, if a reduced MTF value is within a permissible range, the phase difference of transmission wave front may be set to be in the vicinity of $1\lambda$ or in the vicinity of $2\lambda$.

In other words, the phase difference of transmission wave front may be $$\{n\pm(1/5)\}\lambda(n=0, 1, 2).$$

According to such a structure, there can be realized a light quantity adjusting device in which the deterioration of the MTF value can be minimized even in a state in which the aperture is reduced, thereby improving an image quality. In addition, when the light quantity adjusting device of this embodiment is used for an image taking apparatus such as a video camera or a digital still camera, an image pickup element in which the deterioration of the image quality is suppressed and a pixel pitch is small can be used.

Embodiment 2

Embodiment 2 of the present invention is shown in FIGS. 4A, 4B, 4C and 4D. FIGS. 4A, 4B, 4C and 4D show an embodiment of a light quantity adjusting device (diaphragm device) to which the present invention is applied as in Embodiment 1. However, it is different from Embodiment 1, and is an embodiment of a device for separately actuating diaphragm blades and an ND filter to adjust a quantity of light.

Figure 4:
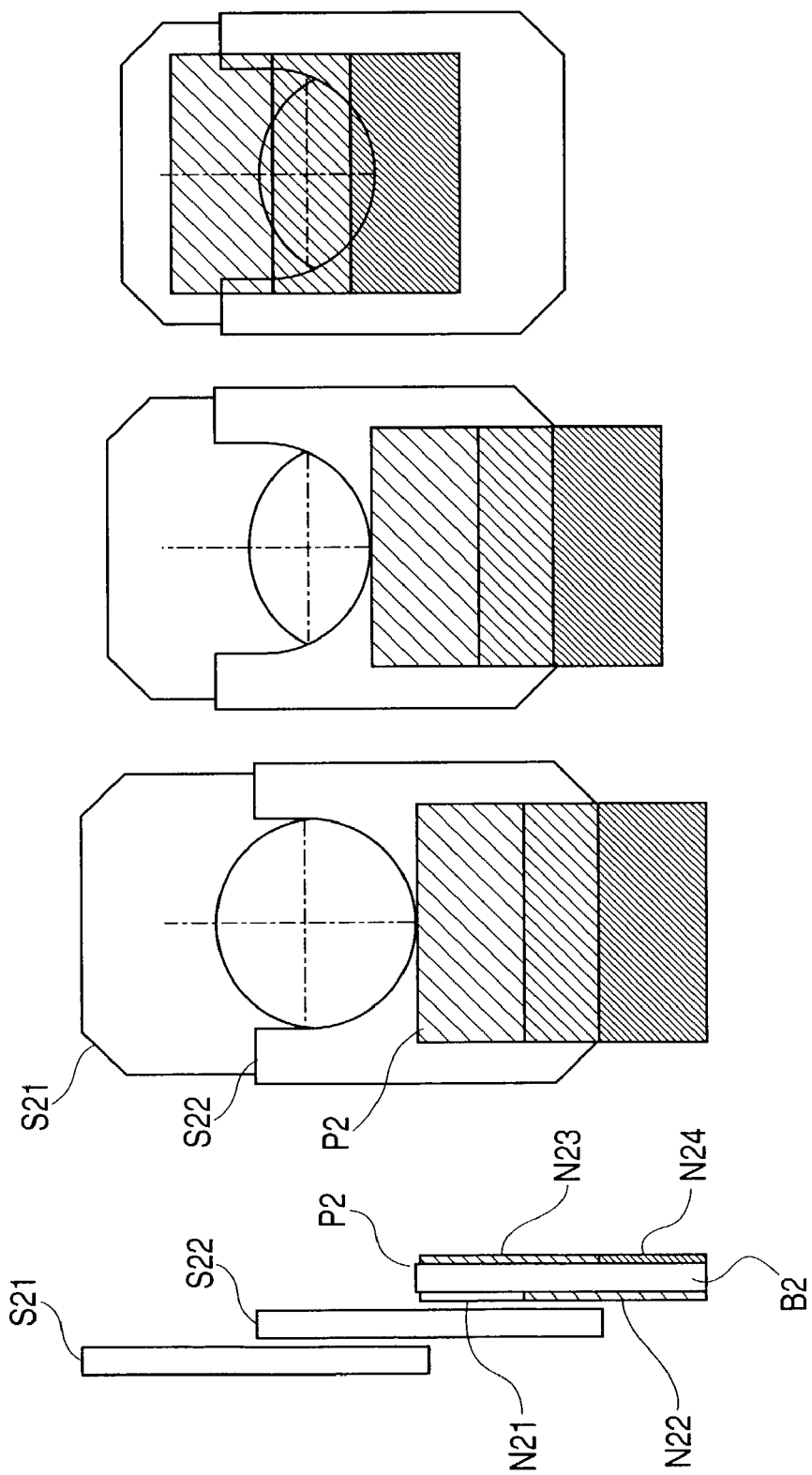
FIGS. 4A, 4B, 4C and 4D are schematic structural views of a light quantity adjusting device of Embodiment 2.

In the drawings, reference symbols S21 and S22 denote diaphragm blades for forming an aperture, and an aperture area can be changed by relatively moving them. Reference symbol P2 denotes an ND filter which can be actuated independently from the diaphragm blades S21 and S22. In this embodiment, a quantity of light is adjusted by reducing the aperture by the diaphragm blades S21 and S22 from an open state shown in FIG. 4A to a predetermined aperture state shown in FIG. 4B. After these states, a quantity of light is adjusted by inserting the ND filter P2 into the aperture in the order from a large transmittance region to a small transmittance region as shown in FIG. 4C while an aperture area is kept constant.

With respect to the ND filter P2, a region N21 without a light reduction function and a region N22 with predetermined transmittance are formed on one surface of a substrate B2, and a region N23 with the same transmittance as the region N22 and a region N24 with smaller transmittance than those of the regions N22 and N23 are formed on the other surface. Thus, when light passes through the regions N21 and N23, the transmittance becomes maximum. When light passes through the regions N22 and N23, the transmittance becomes the second-greatest. When light passes through the regions N22 and N24, the transmittance becomes minimum. Therefore, according to the ND filter P2 of this embodiment, three kinds of transmittances (densities) are set by a combination of evaporation ND films having two kinds of transmittances. In addition, setting is conducted such that a difference between a density obtaining by combining the regions N21 and N23 and a density obtained by combining the regions N22 and N23, and a difference between a density obtained by combining the regions N22 and N23 and a density obtained by combining the regions N22 and N24 each become 0.5 or less.

Note that the same substrate as the substrate B1 described in Embodiment 1 is used as the substrate B2.

Figure 5:
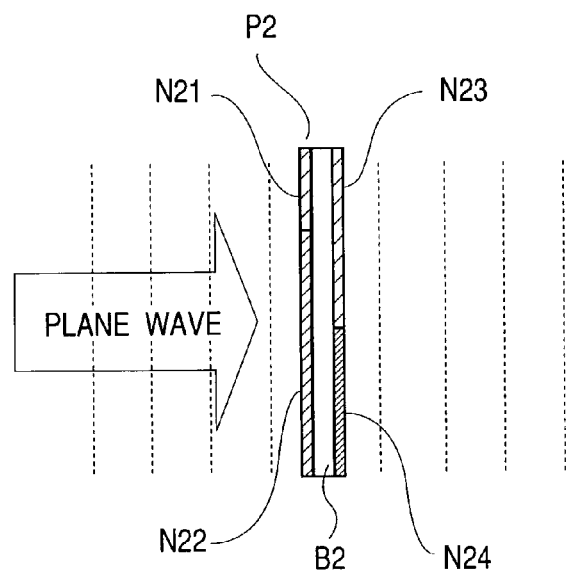
FIG. 5 shows a state of a phase of a wave front passed through an ND filter of the light quantity adjusting device of Embodiment 2.

FIG. 5 shows a state of a transmission wave front passing through the ND filter portion P2. Even in this embodiment, film thicknesses of the regions N21, N22, N23, and N24 and refraction indexes of materials therefor are set as appropriate so that a phase difference of transmission wave front including a manufacturing error becomes $(1/5)\lambda$ or less (mechanical step becomes 0.17 μm or less).

Figure 6:
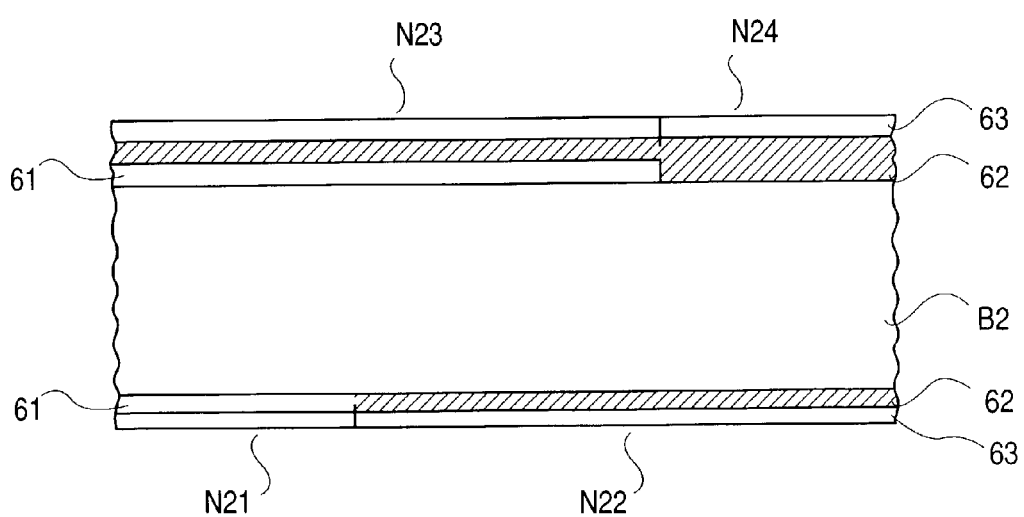
FIG. 6 is an enlarged sectional view of the ND filter of Embodiment 2.

FIG. 6 is an enlarged sectional view of the ND filter P2. The respective regions N21, N22, N23, and N24 of this embodiment are also composed of a base coat layer 61, an ND layer 62, and an AR coat layer 63 as in the respective density regions of Embodiment 1. This embodiment is characterized in that the region N21 without a light reduction function is composed only of the base coat layer 61 and the AR coat layer 63. Even in this embodiment, a film thickness of the base coat layer 61 is suitably set. Thus, correction is conducted such that the phase difference of transmission wave front in each region becomes $(1/5)\lambda$ or less. Note that materials used for the base coat layer 61, the ND layer 62, and the AR coat layer 63 are the same as in Embodiment 1.

Note that, even in this embodiment, the phase difference of transmission wave front may be set to be in the vicinity of $1\lambda$ or the vicinity of $2\lambda$ as in Embodiment 1.

In this embodiment, a light quantity adjusting device in which the deterioration of the MTF value can be minimized even in a state in which the aperture is reduced, thereby improving an image quality can be realized as in Embodiment 1. In addition, when the light quantity adjusting device of this embodiment is used for an image taking apparatus such as a video camera or a digital still camera, an image pickup element in which the deterioration of the image quality is suppressed and a pixel pitch is small can be used.

Embodiment 3

Figure 7:
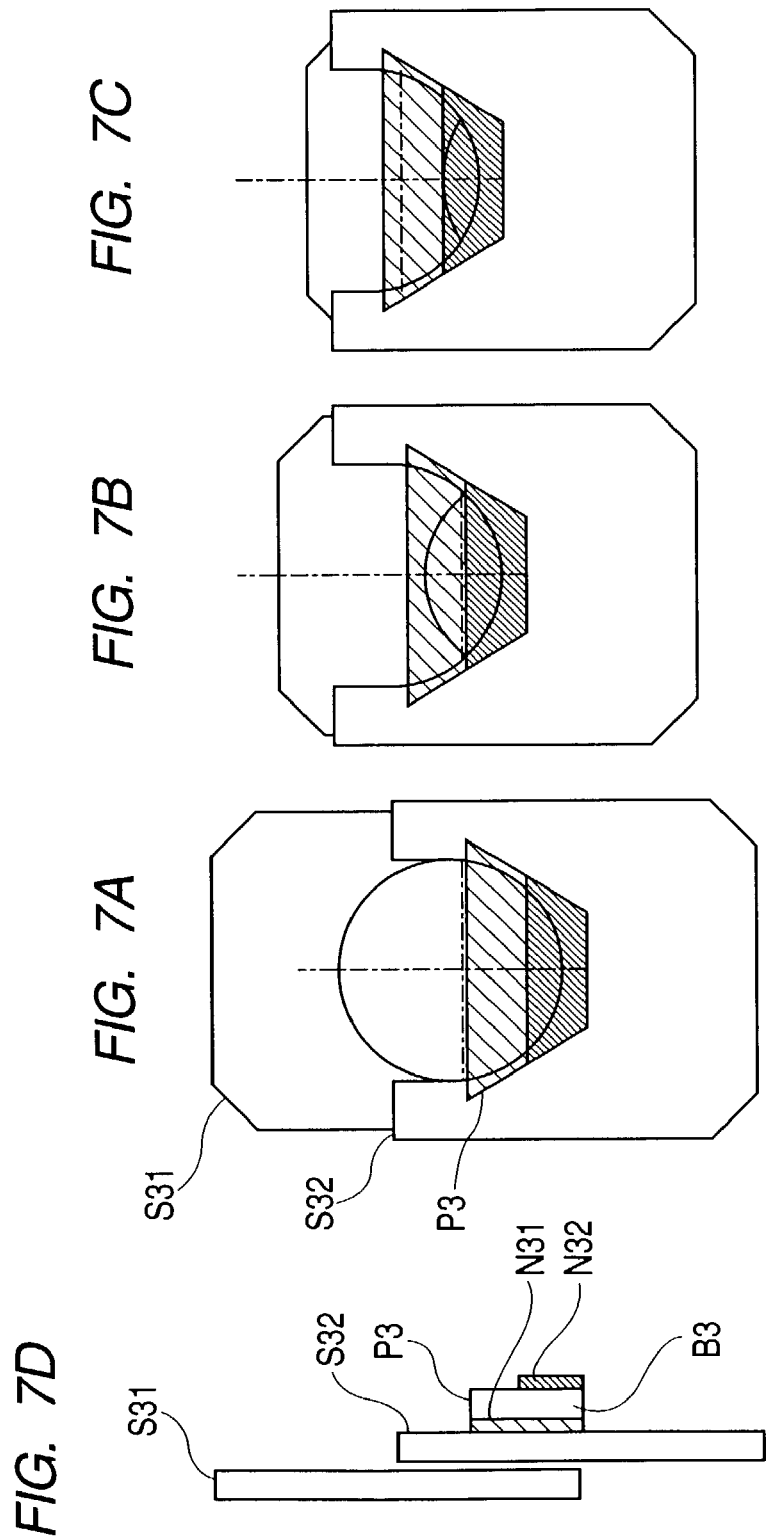
FIGS. 7A, 7B, 7C and 7D are schematic structural views of a light quantity adjusting device of Embodiment 3.

Embodiment 3 of the present invention is shown in FIGS. 7A to 7C. FIGS. 7A to 7C show an embodiment of a light quantity adjusting device (diaphragm device) to which the present invention is applied as in Embodiment 1. FIG. 7A shows a full open aperture state, FIG. 7B shows a middle aperture state, FIG. 7C shows a minimum aperture state, and FIG. 7D is a side view of FIG. 7A.

In the drawings, reference symbols S31 and S32 denote diaphragm blades for forming a diaphragm aperture and an aperture area can be changed by relatively moving them. Reference symbol P3 denotes an ND filter (filter member) which is attached to the diaphragm blade S32 and fixed thereto. Thus, an area of the aperture covered with the ND filter P3 is changed as the diaphragm blades S31 and S32 are relatively moved.

With respect to the ND filter P3, a region N31 with predetermined transmittance is formed on one surface of a substrate B3, and a region N32 with transmittance different from that of the region N31 is formed on a portion of the other surface. Thus, between the case where light passes through only the region N31 and the case where light passes through both the regions N31 and N32, the transmittances are different. That is, the transmittance in the case where light passes through only the region N31 is greater.

A synthetic resin film made of cellulose acetate, polyethylene terephthalate (PET), vinyl chloride, acrylic resin, or the like is used for the substrate B3. A main reason for using the synthetic resin film is that specific gravity is small and it is hard to break even in the case of processing into a thin film. A thickness of the substrate B3 is about 100 μm to 50 μm.

Figure 8:
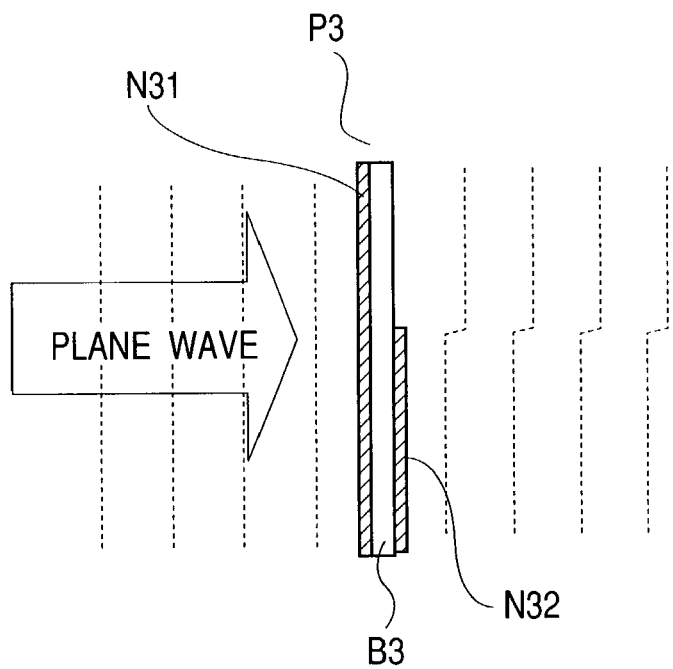
FIG. 8 shows a state of a phase of a wave front passed through an ND filter of the light quantity adjusting device of Embodiment 3.

FIG. 8 shows a state of a transmission wave front passing through the ND filter portion P3. With respect to the respective regions N31 and N32 in FIG. 8, respective transmittances are set using the evaporation films. Film thicknesses of the respective regions and refraction indexes of materials therefor are set as appropriate so that a phase difference of transmission wave front including a manufacturing error is within a range of $\{1+(1/5)\}\lambda$ or $\{2+(1/5)\}\lambda$.

Figure 9:
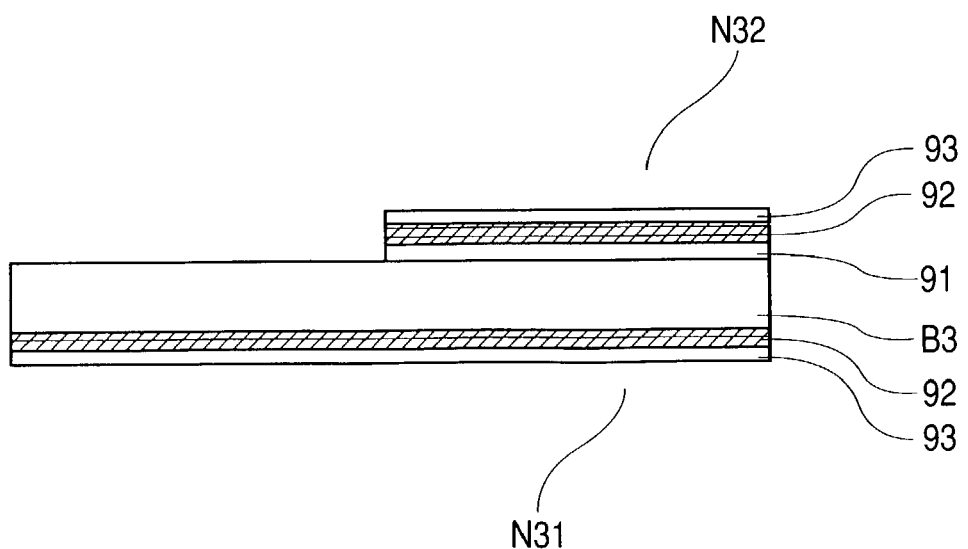
FIG. 9 is an enlarged sectional view of the ND filter of Embodiment 3.

As shown in FIG. 9, the region N32 of the ND filter P3 has three functional evaporation layers on the film-like substrate B3. In other words, there are a base coat layer 91 for setting a phase difference of transmission wave front to a predetermined value ($\{1\pm(1/5)\}\lambda$ or $\{2\pm(1/5)\}\lambda$, an ND layer 92 for uniformly reducing transmittance without depending on a wavelength, and an AR coat layer 93 for preventing surface reflection. The region N31 is composed only of the ND layer 92 and the AR coat layer 93 without having the base coat layer 91.

With respect to the base coat layer 91, a film thickness of a dielectric film which is made of $Al_2O_3$, $SiO_2$, or the like and has a refraction index close to that of the substrate B3 is suitably set and it is formed on the substrate B3 by evaporation to set the phase difference of transmission wave front to the desired value. The ND layer 92 for reducing the transmittance is made from a multi-layer film and provided so as to reduce wavelength dependency. The ND layer 92 has a minute thickness for setting a desired transmittance (desired density). This becomes a main factor for a phase difference of transmission wave front. The base coat layer 91 is used for adjusting this to a suitable phase difference of transmission wave front. The AR coat layer 93 for preventing surface reflection is formed as a final layer by evaporation. The AR coat layer 93 is obtained by forming a dielectric film made of $MgF_2$ or the like by evaporation.

Here, a phase difference of transmission wave front suitable for suppressing the deterioration of the optical performance due to the influence of a minute thickness component is the case where a phase difference of lights with a predetermined wavelength $\lambda$ is in the vicinity of $0\lambda$, the vicinity of $1\lambda$, or the vicinity of $2\lambda$. In this embodiment, a range of "$\pm(1/5)\lambda$" is assumed as a range of "the vicinity" When "the vicinity of $0\lambda$, the vicinity of $1\lambda$, or the vicinity of $2\lambda$" is expressed by a formula, the following is obtained. That is, $\{n\pm(1/5)\}\lambda(n=0, 1, 2)$.

When the deterioration of the optical performance is minimized, it is desirable that the phase difference of transmission wave front is set to be in the vicinity of $0\lambda$ (($1/5)\lambda$ or less) as described in Embodiments 1 and 2. However, in order to set the phase difference of transmission wave front to the vicinity of $0\lambda$, because the region N32 has a predetermined thickness, it is required that a region for correcting a phase difference of transmission wave front produced therein is provided by a step separated from a step of forming the regions N31 and N32. This means an increase in the number of manufacturing steps so that it leads to a higher cost. Therefore, in this embodiment, setting is conducted such that the phase difference of transmission wave front is within a range of $\{1\pm(1/5)\}\lambda$ or $\{2+(1/5)\}\lambda$ using a base coat layer 91 which can be formed by a part of a step of forming a film composing the region N32.

When the relationships between the phase difference of transmission wave front and the white MTF as shown in FIGS. 30A and 30B are referred to, if the phase difference of transmission wave front exceeds $\{n+(1/5)\}\lambda$, the MTF value is rapidly deteriorated. In a state in which the phase difference of transmission wave front is $\{n+(1/4)\}\lambda$ to $\{n+(3/4)\}\lambda$, the MTF value is decreased as compared with a state in which the phase difference of transmission wave front of $5\lambda$ or more is produced. In a state with a small F number (state with a large diaphragm aperture), the deterioration of the MTF value is relatively less as compared with a state in which there is completely no phase difference of transmission wave front. This is particularly remarkable in a state with a large F number (state with a small diaphragm aperture). It is apparent that, in a region in which the phase difference of transmission wave front is $\{n\pm(1/5)\}\lambda$, the MTF value is restored while attenuating at a large cycle as compared with a region from $\{n+(1/4)\}\lambda$ to $\{n+(3/4)\}\lambda$.

In this embodiment, as shown in FIG. 7A, the state in which the edge portion of the ND filter P3 which has a thickness of several μm or more is located within the diaphragm aperture corresponds to the state in which the phase difference of transmission wave front of $5\lambda$ or more is produced. However, in the case of a small F number as shown in FIG. 7A, setting is conducted so as to obtain such a state. Thus, the deterioration of the optical performance is suppressed to a level in which no problem is caused in practice.

On the other hand, in the case of a large F number in the middle aperture state as shown in FIG. 7B, setting is conducted such that the entire aperture is covered with the ND filter P3. In addition to this, setting is conducted such that the phase difference of transmission wave front of the ND filter P3 becomes $\{1\pm(1/5)\}\lambda$ or $\{2\pm(1/5)\}\lambda$. Thus, the deterioration of the optical performance can be suppressed. In addition, in the case of a large F number as shown in FIG. 7C, a state without a density step and a phase difference of transmission wave front is set so that the deterioration of the optical performance can be suppressed.

In this embodiment, a light quantity adjusting device in which the deterioration of the MTF value can be minimized even in a state in which the aperture is reduced, thereby improving an image quality can be realized as in Embodiment 1. In addition, when the light quantity adjusting device of this embodiment is used for an image taking apparatus such as a video camera or a digital still camera, an image pickup element in which the deterioration of the image quality is suppressed and a pixel pitch is small can be used.

Embodiment 4

Embodiment 4 of the present invention is shown in FIGS. 10A, 10B, 10C and 10D. FIGS. 10A, 10B, 10C and 10D show an embodiment of a light quantity adjusting device (diaphragm device) to which the present invention is applied as in Embodiment 1. As in Embodiment 2, Embodiment 4 is an embodiment of a device for separately actuating diaphragm blades and an ND filter to adjust a quantity of light.

Figure 10:
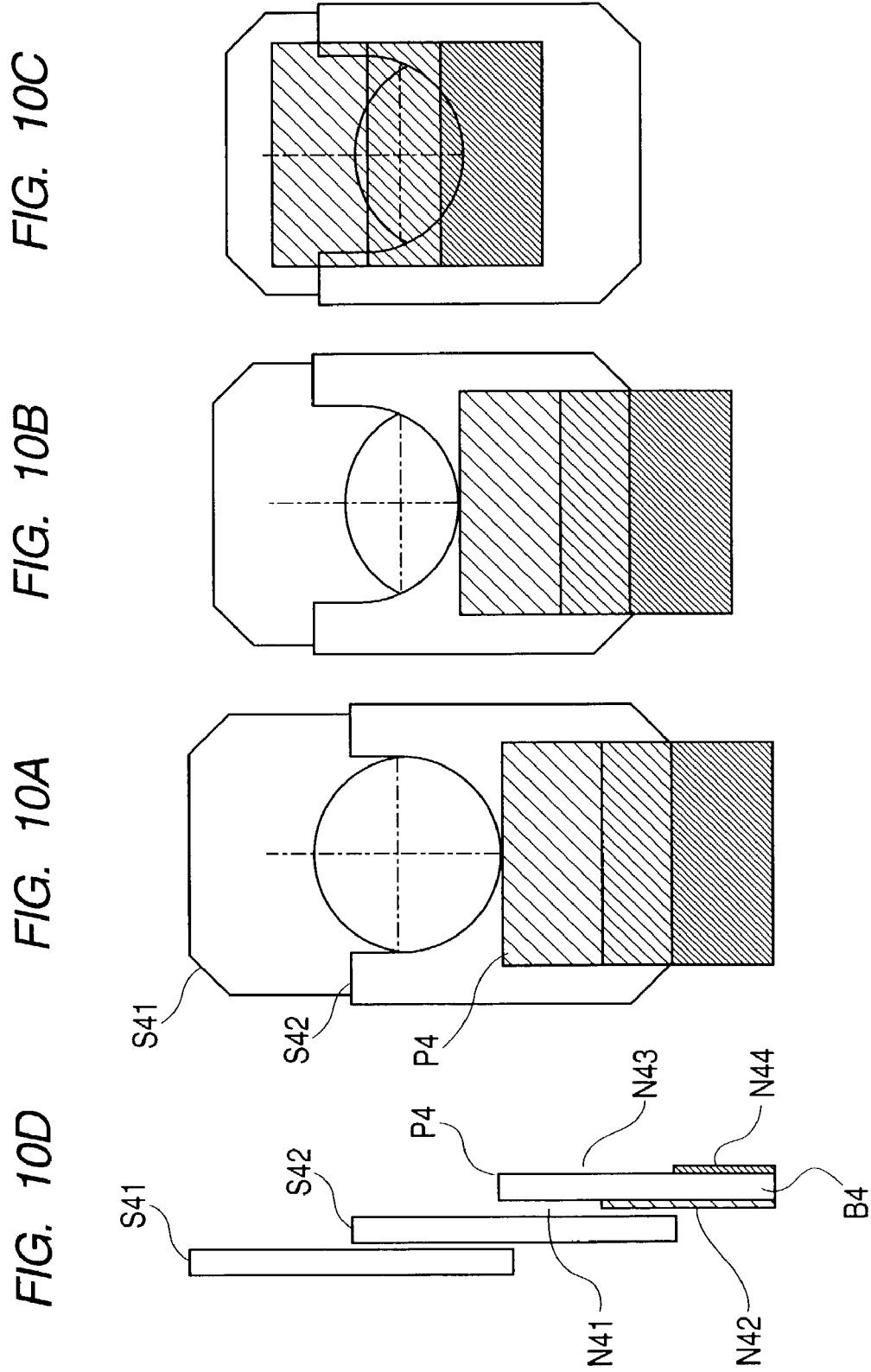
FIGS. 10A, 10B, 10C and 10D are schematic structural views of a light quantity adjusting device of Embodiment 4.

In the drawings, reference symbols S41 and S42 denote diaphragm blades for forming an aperture and an aperture area can be changed by relatively moving them. Reference symbol P4 denotes an ND filter which can be actuated separate from the diaphragm blades S41 and S42. In this embodiment, a quantity of light is adjusted by reducing the aperture by the diaphragm blades S41 and S42 from an open state shown in FIG. 10A to a predetermined aperture state shown in FIG. 10B. After these states, a quantity of light is adjusted by inserting the ND filter P4 into the aperture in the order from a large transmittance region to a small transmittance region as shown in FIG. 10C while an aperture area is kept constant.

With respect to the ND filter P4, a region N41 without a light reduction function and a region N42 with predetermined transmittance are formed on one surface of a substrate B4, and a region N43 without a light reduction function and a region N44 with the same transmittance as the region N42 are formed on the other surface. Thus, when light passes through the regions N41 and N43, the transmittance becomes maximum. When light passes through the regions N42 and N43, the transmittance becomes secondly great. When light passes through the regions N42 and N44, the transmittance becomes minimum. Therefore, according to the ND filter P4 of this embodiment, three kinds of transmittances (densities) are set by a combination of evaporation ND films having two kinds of transmittances. Note that the same substrate as the substrate B1 described in Embodiment 1 is used as the substrate B4.

Figure 11:
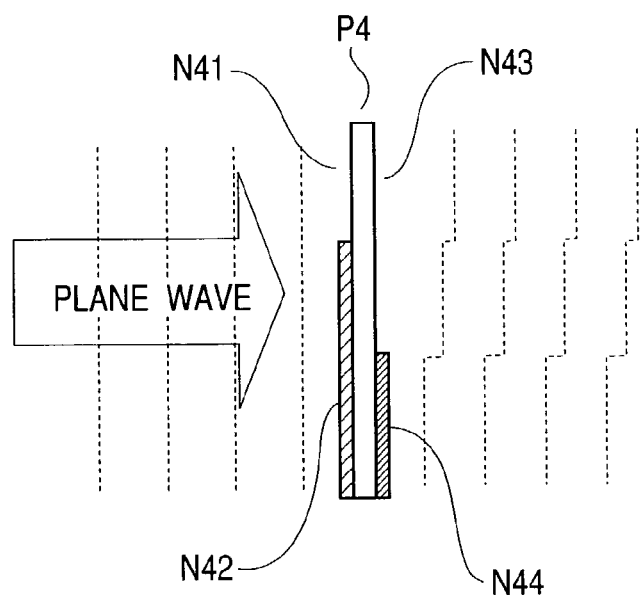
FIG. 11 shows a state of a phase of a wave front passed through an ND filter of the light quantity adjusting device of Embodiment 4.

FIG. 11 shows a state of a transmission wave front passing through the ND filter portion P4. Even in this embodiment, film thicknesses of the regions N42 and N44 and refraction indexes of materials therefor are set as appropriate so that a phase difference of transmission wave front including a manufacturing error becomes $\{1(1/5)\}\lambda$ or $\{2+(1/5)\}\lambda$.

Figure 12:
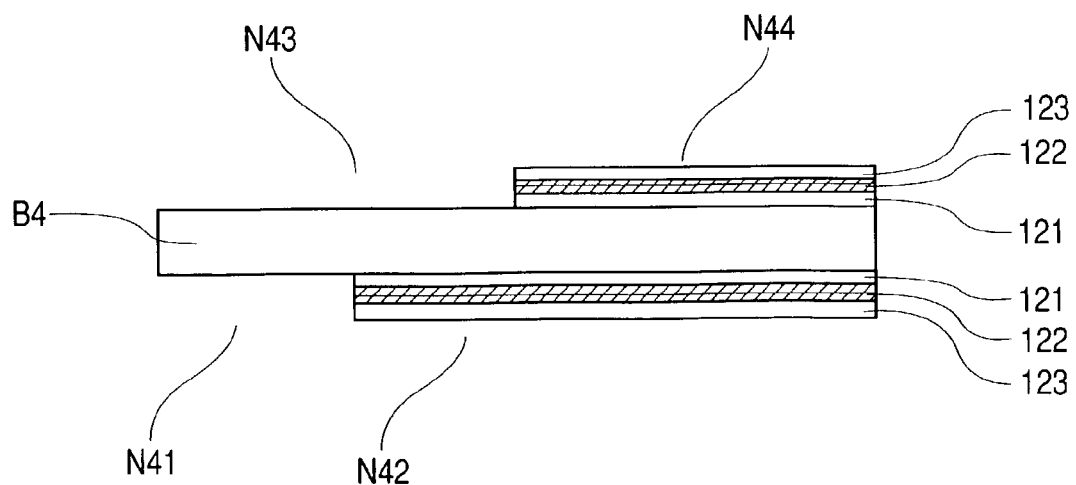
FIG. 12 is an enlarged sectional view of the ND filter of Embodiment 4.

FIG. 12 is an enlarged sectional view of the ND filter P4. The respective regions N42 and N44 of this embodiment are also composed of a base coat layer 121, an ND layer 122, and an AR coat layer 123 as in the respective density regions of Embodiment 3. Even in this embodiment, a film thickness of the base coat layer 121 is suitably set. Thus, correction is conducted such that the phase difference of transmission wave front of each region becomes in the range of $\{1\pm(1/5)\}\lambda$ or $\{2\pm(1/5)\}\lambda$. Note that materials used for the base coat layer 121, the ND layer 122, and the AR coat layer 123 are the same as in Embodiment 3.

In this embodiment, a light quantity adjusting device in which the deterioration of the MTF value can be minimized even in a state in which the aperture is reduced, thereby improving an image quality can be realized as in Embodiment 1. In addition, when the light quantity adjusting device of this embodiment is used for an image taking apparatus such as a video camera or a digital still camera, an image pickup element in which the deterioration of the image quality is suppressed and a pixel pitch is small can be used.

Embodiment 5

Figure 13:
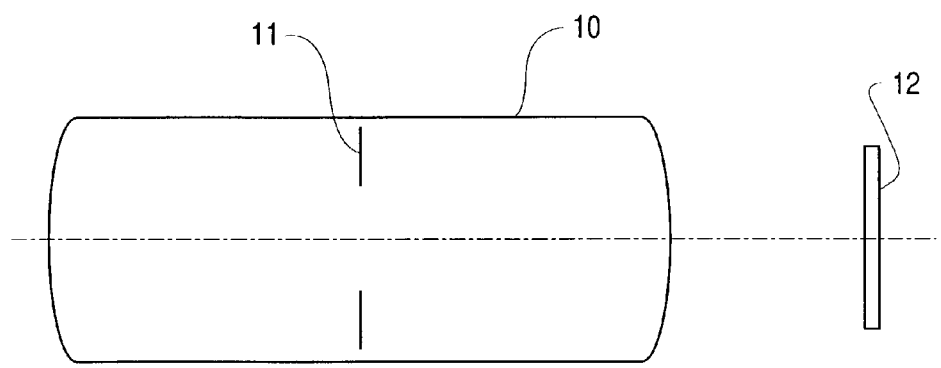
FIG. 13 is a schematic structural view of an optical system including a light quantity adjusting device.

FIG. 13 is a schematic structure view of an optical system to which the light quantity adjusting device described in Embodiments 1 to 4 is applied.

In FIG. 13, reference numeral 10 denotes an image taking optical system composed of a refraction system, a reflection system, a diffraction system, and the like, 11 denotes a diaphragm for limiting light passing through the optical system 10 to adjust lightness, and 12 denotes a solid image pickup element (photoelectric conversion element) such as a CCD or a CMOS for receiving a subject image formed by the optical system 10 on a light receiving surface and converting it into an electric signal. In this embodiment, the light quantity adjusting device described in Embodiments 1 to 4 is used for the diaphragm 11.

Thus, when the light quantity adjusting device as described in Embodiments 1 to 4 is used as the diaphragm of the optical system such as an image taking optical system, the influence of the ND filter resulting from the phase difference of transmission wave front at the time of narrowing the aperture can be reduced to thereby improve an image quality. In addition, an image pickup element with a small pixel pitch can be used.

Embodiment 6

Next, an embodiment of an image taking apparatus using the image taking optical system described in Embodiment 5 will be described using FIG. 14.

Figure 14:
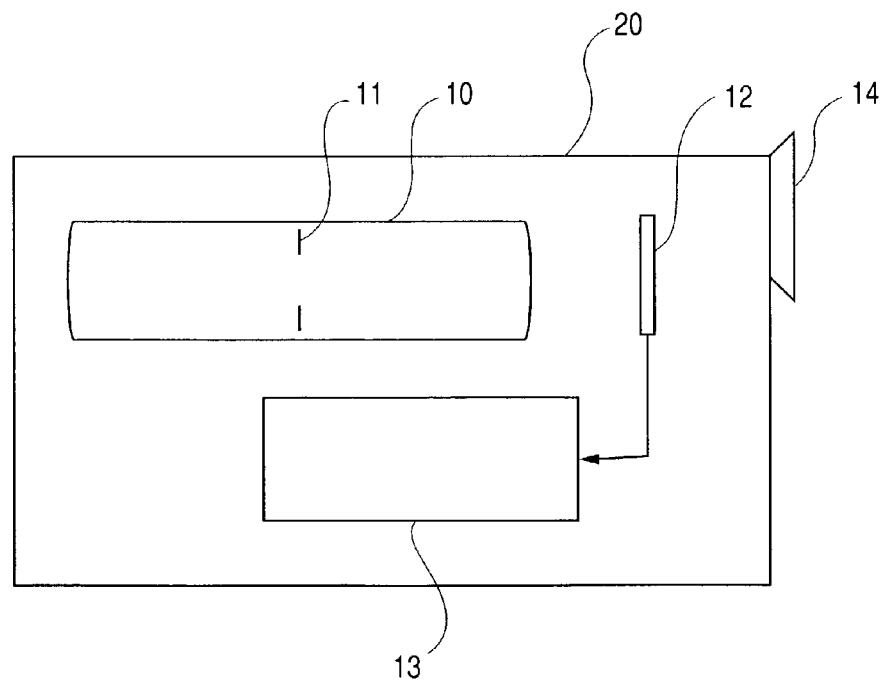
FIG. 14 a schematic structural view of an image taking apparatus including a light quantity adjusting device.
Figure 16A:
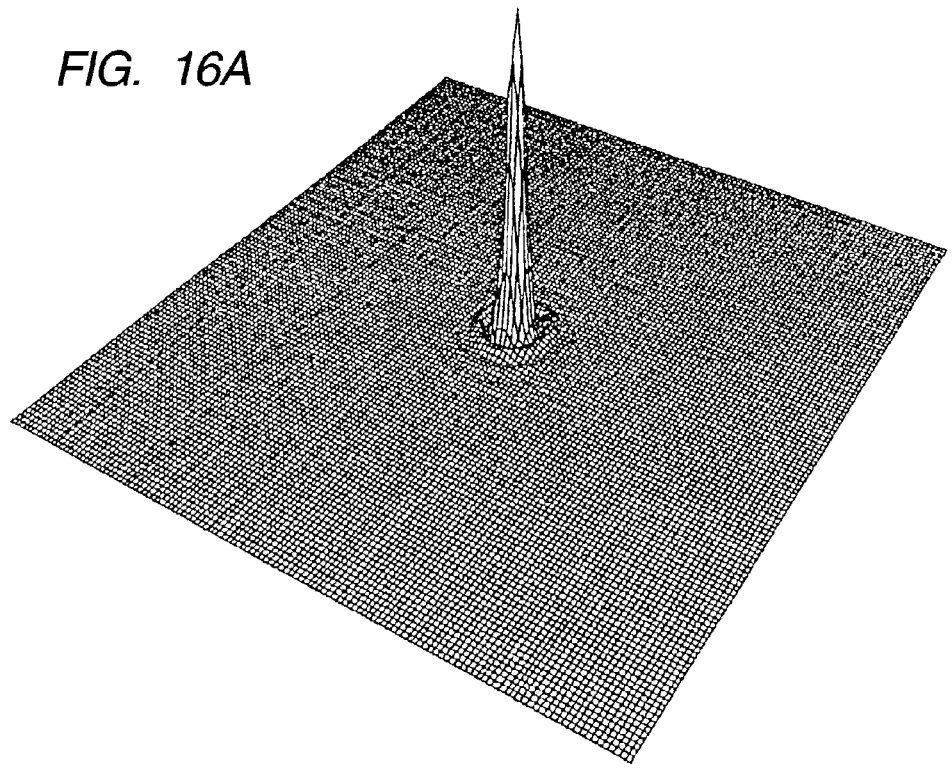
FIGS. 16A, 16B and 16C show a point image intensity distribution of monochromatic light in the case of a phase difference of (0/4)λ.
Figure 16B:
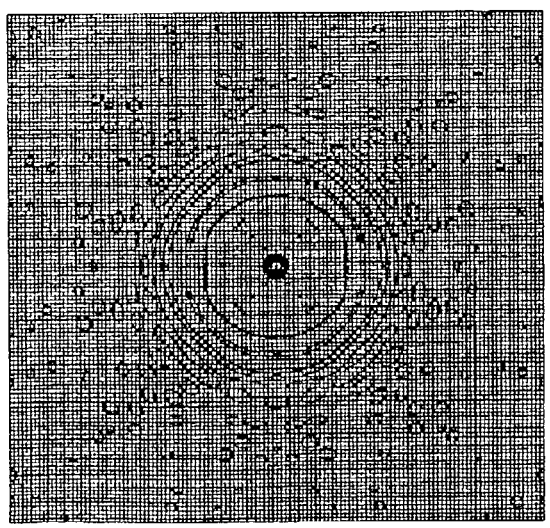
Figure 16C:
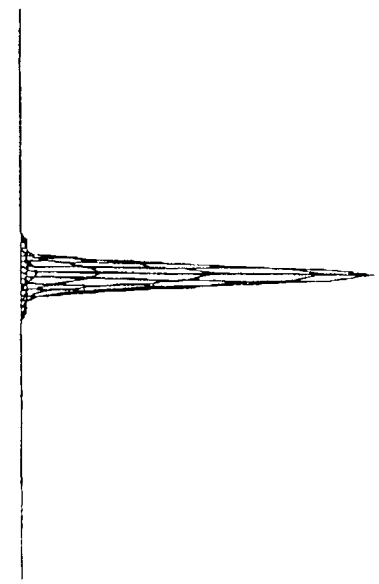
Figure 17A:
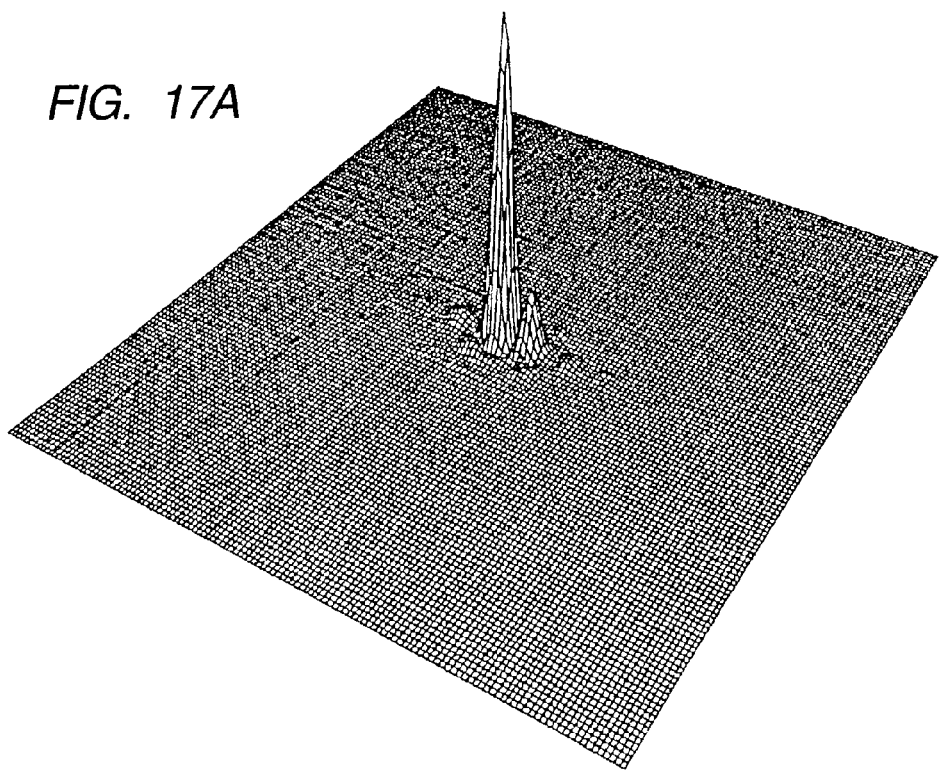
FIGS. 17A, 17B and 17C show a point image intensity distribution of monochromatic light in the case of a phase difference of (1/4)λ.
Figure 17B:
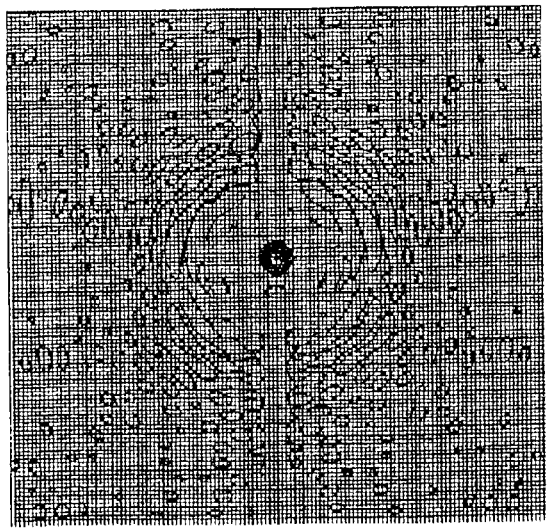
Figure 17C:
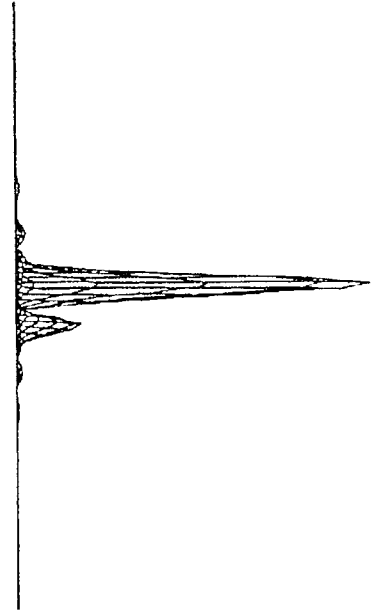
Figure 18A:
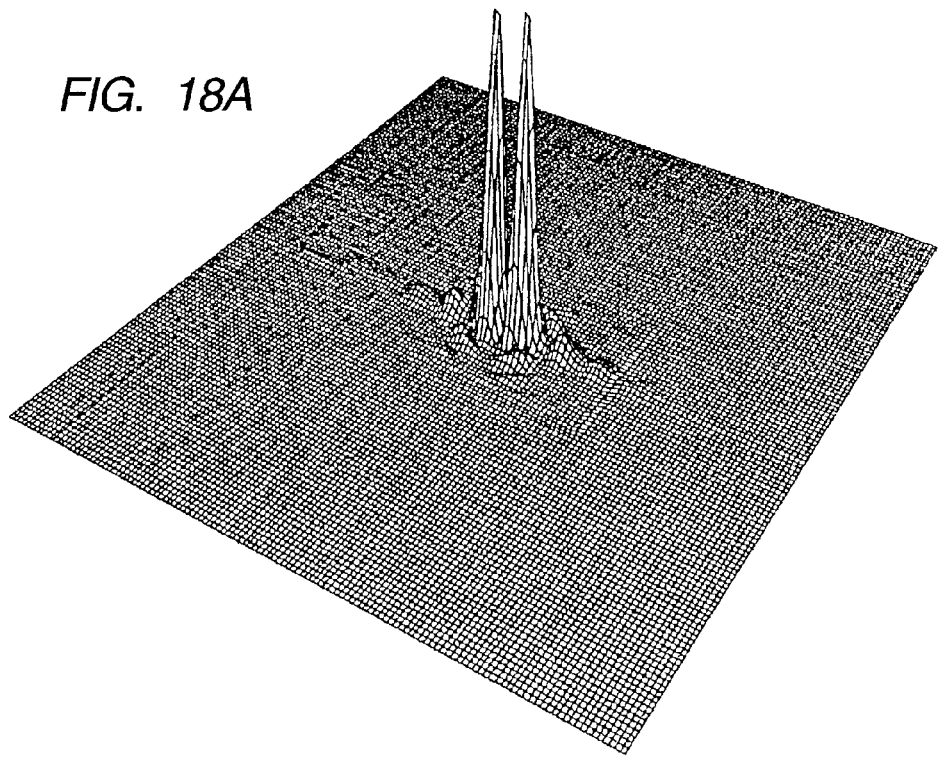
FIGS. 18A, 18B and 18C show a point image intensity distribution of monochromatic light in the case of a phase difference of (2/4)λ.
Figure 18B:
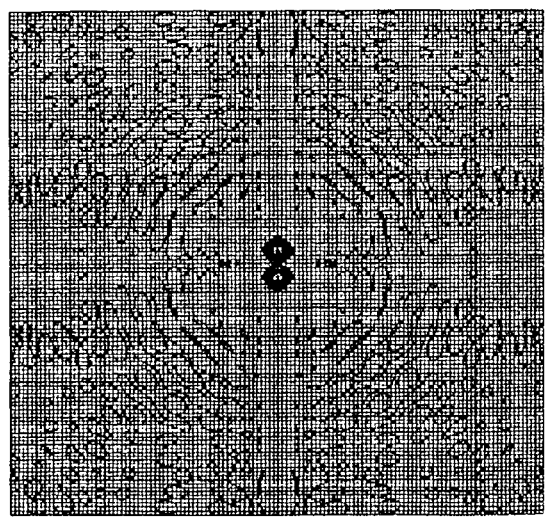
Figure 18C:
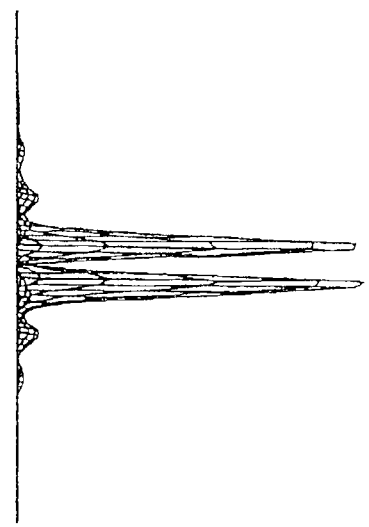
Figure 20A:
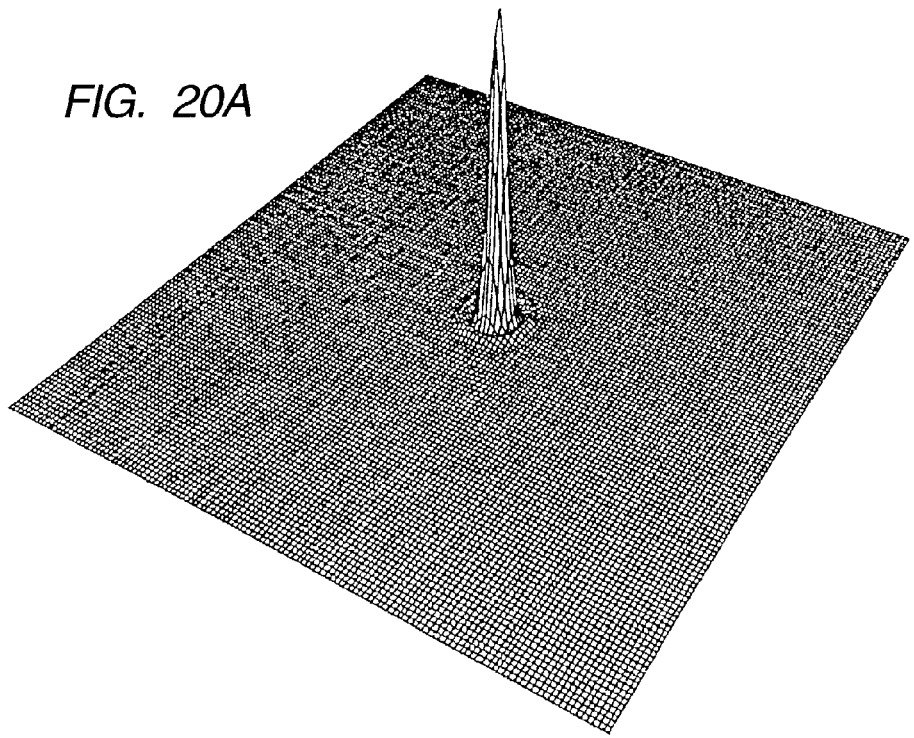
FIGS. 20A, 20B and 20C show a point image intensity distribution of monochromatic light in the case of a phase difference of (4/4)λ.
Figure 20B:
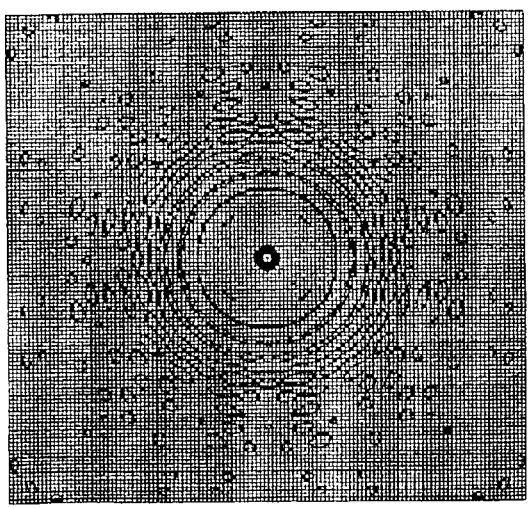
Figure 20C:
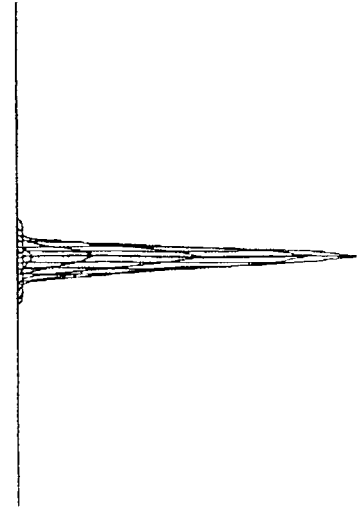
Figure 21A:
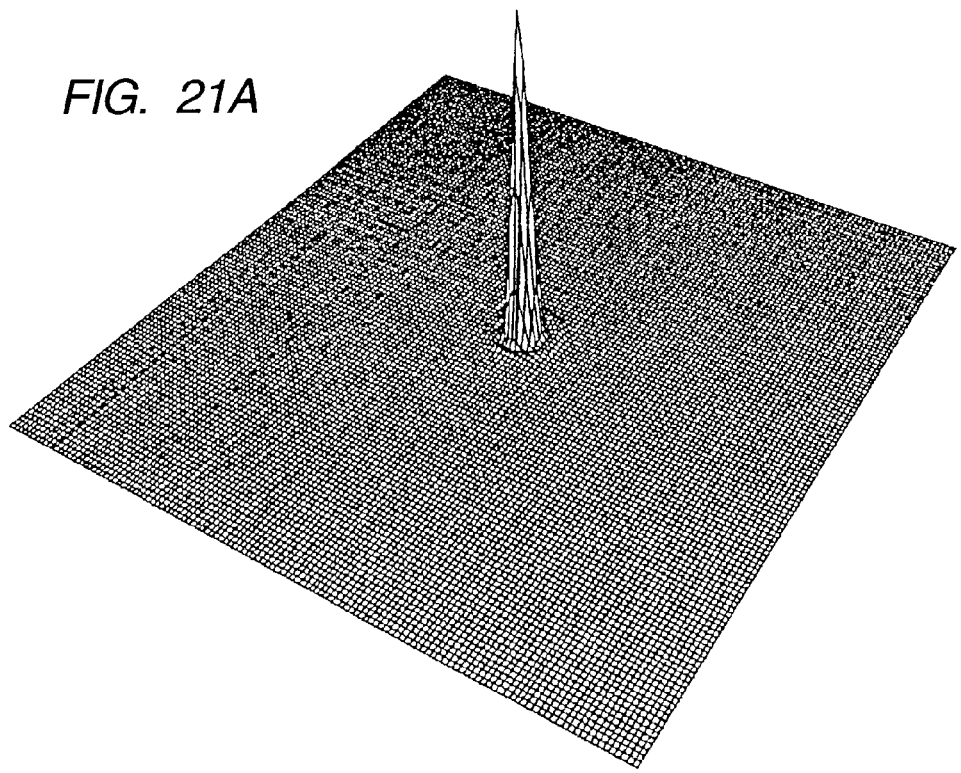
FIGS. 21A, 21B and 21C show a point image intensity distribution of white light in the case of a phase difference of (0/4)λ.
Figure 21B:
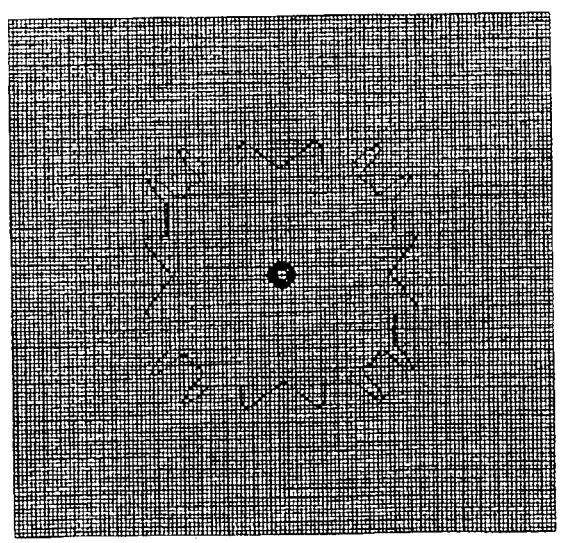
Figure 21C:
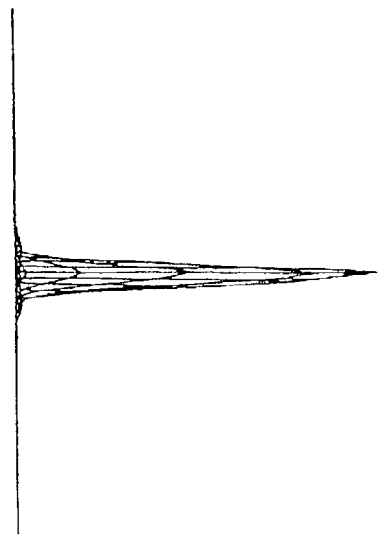
Figure 22A:
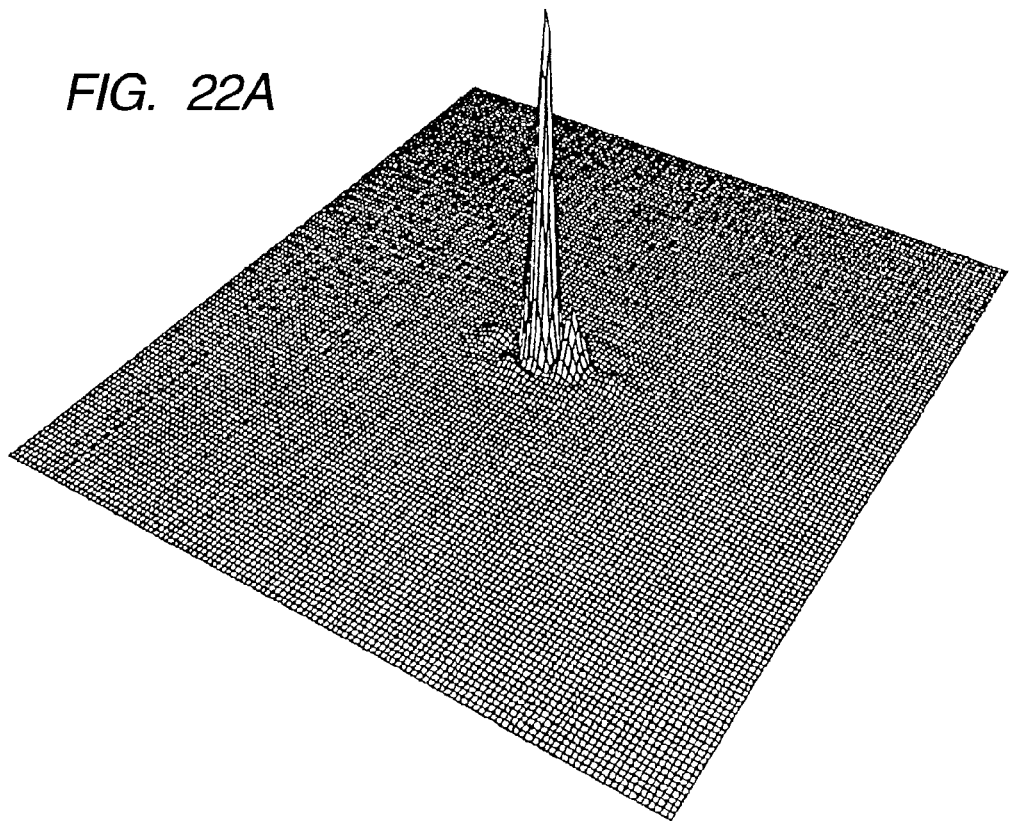
FIGS. 22A, 22B and 22C show a point image intensity distribution of white light in the case of a phase difference of (1/4)λ.
Figure 22B:
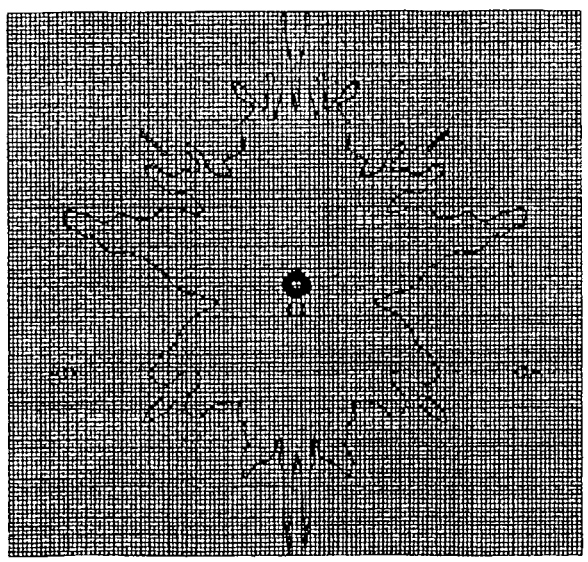
Figure 22C:
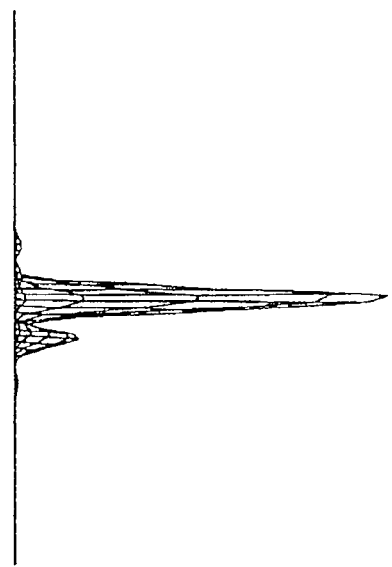

In FIG. 14, reference numeral 20 denotes a main body of an image taking apparatus, 10 denotes an image taking optical system described in Embodiment 5, 11 denotes a diaphragm composed of the light quantity adjusting device of Embodiments 1 to 4, 12 denotes a solid image pickup element for receiving a subject image formed by the image taking optical system 10, 13 denotes a recording medium for recording the subject image received by the image pickup element 12, and 14 denotes a finder for observing the subject image. An optical finder or a finder of a type for observing the subject image displayed on a display element such as a liquid crystal panel is considered as the finder 14.

Thus, when the image taking optical system described in Embodiment 5 is applied to an image taking apparatus a type for forming the subject image on the image pickup element such as a video camera or a digital still camera, the influence of the ND filter resulting from the phase difference of transmission wave front can be reduced to thereby improve an image quality. In addition, an image pickup element with a small pixel pitch can be used.

As described above, according to the present invention, the light quantity adjusting device in which the deterioration of the optical performance due to the influence of a minute thickness component of the filter member is suppressed can be realized.

Also, when the light quantity adjusting device of the present invention is used for the image taking optical system of an image taking apparatus for forming an image on an image pickup element, preferable image information can be obtained even if the image pickup element with a small pixel pitch is used.

What is claimed is:

1. A light quantity adjusting device which comprises a diaphragm for forming an aperture and a filter member for attenuating a quantity of light passing through the aperture and in which a cover ratio of the aperture by the filter member is changed, wherein the filter member includes a plurality of regions having different transmittances, wherein in a state in which the aperture is completely covered with the filter member, each of the plurality of regions of the filter member is configured so that a phase difference between lights with a predetermined wavelength $\lambda$, which pass through the respective regions of the filter member inside the aperture, is within one of the following three ranges:

$(-1/5)\lambda$ to $(1/5)\lambda$;
$(1-1/5)\lambda$ to $(1+1/5)\lambda$; and
$(2-1/5)\lambda$ to $(2+1/5)\lambda$, wherein the filter member comprises: a substrate; a first region which is formed on a first surface of the substrate and does not have an ND layer; a second region which is formed on a region different from the first region on the first surface of the substrate and has an ND layer having a predetermined transmittance; a third region which is formed on a second surface of the substrate and has an ND layer having the predetermined transmittance; and a fourth region which is formed on a region different from the third region on the second surface of the substrate and has an ND layer having a transmittance smaller than the predetermined transmittance, wherein the second region and the fourth region are different from each other in area, wherein the second surface is located on a side of the substrate facing an opposite direction as compared to the first surface, wherein the first region includes a base coat layer and an AR coat layer provided on the base coat layer, wherein the second region includes the respective ND layer having the predetermined transmittance and an AR coat layer provided on the respective ND layer having the predetermined transmittance, wherein the third region includes a base coat layer, the respective ND layer which is provided on the base coat layer and has the predetermined transmittance, and an AR coat layer provided on the respective ND filter having the predetermined transmittance, wherein the fourth region includes the ND layer having a transmittance smaller than the predetermined transmittance, and an AR coat layer provided on the ND layer having the transmittance smaller than the predetermined transmittance, and wherein each of the base coat layers is configured to have a film thickness that causes the phase difference to be within one of the three ranges.

2. A light quantity adjusting device which comprises a diaphragm for forming an aperture and a filter member for attenuating a quantity of light passing through the aperture and in which a cover ratio of the aperture by the filter member is changed, wherein the filter member includes a plurality of regions having different transmittances, wherein in a state in which the aperture is completely covered with the filter member, each of the plurality of regions of the filter member is configured so that a phase difference between lights with a predetermined wavelength $\lambda$, which pass through the respective regions of the filter member inside the aperture, is within one of the following three ranges:

$(-1/5)\lambda$ to $(1/5)\lambda$;
$(1-1/5)\lambda$ to $(1+1/5)\lambda$; and
$(2-1/5)\lambda$ to $(2+1/5)\lambda$, wherein the filter member comprises: a substrate; a first region which is formed on a first surface of the substrate and has an ND layer having a predetermined transmittance; and a second region which is formed on a second surface of the substrate and has an ND layer having a transmittance different from the predetermined transmittance, wherein the first region and the second region are different from each other in area, and wherein the second surface is located on a side of the substrate facing an opposite direction as compared to the first surface, wherein the first region includes the ND layer having the predetermined transmittance and an AR coat layer provided on the ND layer having the predetermined transmittance, and wherein the second region includes a base coat layer, an ND layer which is provided on the base coat layer and has a transmittance different from the predetermined transmittance and an AR coat layer provided on the ND layer having the transmittance different from the predetermined transmittance, and wherein each of the base coat layers is configured to have a film thickness that causes the phase difference to be within one of the three ranges.

3. A light quantity adjusting device which comprises a diaphragm for forming an aperture and a filter member for attenuating a quantity of light passing through the aperture and in which a cover ratio of the aperture by the filter member is changed, wherein the filter member includes a plurality of regions having different transmittances, wherein in a state in which the aperture is completely covered with the filter member, each of the plurality of regions of the filter member is configured so that a phase difference between lights with a predetermined wavelength $\lambda$, which pass through the respective regions of the filter member inside the aperture, is within one of the following three ranges:

$(-1/5)\lambda$ to $(1/5)\lambda$;
$(1-1/5)\lambda$ to $(1+1/5)\lambda$; and
$(2-1/5)\lambda$ to $(2+1/5)\lambda$, wherein the filter member comprises: a substrate; a first region which is formed on a first surface of the substrate and has a predetermined transmittance; and a second region which is formed on a second surface of the substrate and has the predetermined transmittance, wherein the first region and the second region are different from each other in area, wherein the second surface is located on a side of the substrate facing an opposite direction as compared to the first surface, wherein the first region includes a base coat layer, an ND layer which is provided on the base coat layer and has the predetermined transmittance, and an AR coat layer provided on the ND layer having the predetermined transmittance, wherein the second region includes a base coat layer, an ND layer which is provided on the base coat layer and has the predetermined transmittance, and an AR coat layer provided on the ND layer having the predetermined transmittance, and wherein each of the base coat layers is configured to have a film thickness that causes the phase difference to be within one of the three ranges.

* * * * *